United States Patent [19]
Yanagi et al.

[11] Patent Number: 5,902,847
[45] Date of Patent: May 11, 1999

[54] COATING COMPOSITION

[75] Inventors: Junpei Yanagi; Haruo Furuse; Kazuhiko Ohnishi, all of Hiratsuka; Masaaki Yamaya; Masahiro Yoshizawa, both of Gunma-ken, all of Japan

[73] Assignee: Kansai Paint Co., Ltd., Amagasaki, Japan

[21] Appl. No.: 08/689,146

[22] Filed: Jul. 30, 1996

[30]  Foreign Application Priority Data

Jul. 31, 1995 [JP] Japan ................................. 7-213052
Jul. 31, 1995 [JP] Japan ................................. 7-213053
Jul. 31, 1995 [JP] Japan ................................. 7-213054
Jul. 31, 1995 [JP] Japan ................................. 7-213055

[51] Int. Cl.$^6$ ........................................ C08K 5/09
[52] U.S. Cl. .................. 524/300; 525/100; 524/315; 524/366; 524/269; 524/379; 524/356; 524/506; 524/863; 524/588
[58] Field of Search ............... 525/100; 524/588, 524/506, 269, 863, 379, 356, 300, 315, 366

[56]  References Cited

U.S. PATENT DOCUMENTS

| | | | |
|---|---|---|---|
| 4,224,211 | 9/1980 | Kanazawa et al. | 525/100 |
| 4,657,986 | 4/1987 | Isayama et al. | 525/100 |
| 5,426,151 | 6/1995 | Brandt et al. | 525/100 |
| 5,432,226 | 7/1995 | Aonuma et al. | 525/100 |
| 5,464,901 | 11/1995 | Yoshikawa et al. | 525/100 |
| 5,500,464 | 3/1996 | Hemma et al. | 525/100 |
| 5,520,767 | 5/1996 | Larson | 525/100 |
| 5,594,061 | 1/1997 | Sharma et al. | 524/506 |
| 5,639,825 | 6/1997 | Nanbu et al. | 525/100 |

*Primary Examiner*—Melvyn I. Marquis
*Attorney, Agent, or Firm*—Cushman Darby & Cushman; IP Group of Pillsbury Madison & Sutro LLP

[57]  ABSTRACT

A coating composition prepared by mixing an organic solvent based coating composition with (1) a silicone compound having organofunctional group and hydrolyzable group in one molecule and containing a specified silicon structural unit, or (2) a silicone compound consisting of a partial cohydrolysis•condensation product of a silane mixture of alkoxysilane compound containing at least one organofunctional group selected from the group consisting of (meth)acryloyl group, vinyl group, haloalkyl group, amino group, epoxy group and mercapto group with tetraalkoxysilane compound.

6 Claims, No Drawings

1

COATING COMPOSITION

BACKGROUND OF THE INVENTION

(1) Field of the Invention

The present invention relates to a coating composition which is applicable to outdoor building structures or outdoor structures for the purpose of decoration or protection, and which is capable of forming a film having excellent properties in crack resistance, flexibility, stain resistance, water resistance, alkali resistance, acid resistance, and the like.

(2) Description of the Prior Art

A highly weather resistant outdoor coating composition as a coating composition applicable to outdoor structures and the like has been developed in the art. Particularly, acrylic silicone resin based coating composition and fluorocarbon resin based coating composition have been considered suitable as outdoor coating composition because of improvement in film resistance to deterioration due to sun light, rain and the like. However, the above coating compositions have such drawbacks that during outdoor exposure, pollutants adhere onto the surface of a coating film to show poor film appearance under the influence of dust, sand dust, iron powder, acid rain as recent problem, etc. in atmosphere.

As a method of preventing adhesion of dust in atmosphere, a method of adding various antistatic agents such as Electrostripper TS-2B (marketed by Kao Corporation, trade name, surfactant based one) and Colcote R (marketed by Colcote Co., Ltd., trade name, alkylsilicate based one), which are capable of reducing the surface resistivity value of the coated film and preventing static adhesion of dust, etc., to a coating composition, or of coating the antistatic agents onto the surface of the film for treating, has been disclosed. However, the above method is unsuitable for outdoor use, because the added antistatic agents show poor water resistance, resulting in making it difficult to maintain the above static adhesion preventing effect.

Japanese Patent Application Laid-Open No. 306328/94 discloses a highly acid rain resistant organic coating composition prepared by adding a condensation product between an, alkylsilicate oligomer and a silane coupling agent such as a hydrolyzate of an epoxy-functional silane to a coating composition.

However, the above organic coating composition has such drawbacks that the above condensation product consists of a mixture of an alkylsilicate oligomer, silane coupling agent oligomer and block condensation product of both oligomers, and consequently the epoxy group of the hydrolyzate of an epoxy-functional silane is not uniformly introduced in the condensation product, but the remaining alkylsilicate oligomer is eluted by water, resulting in that the coated film shows poor water resistance, particularly poor alkali resistance, as well as such drawbacks that the coated film may cause cracks on forming a film and further shows unsatisfactory flexibility.

SUMMARY OF THE INVENTION

It is an object of the present invention to provide a coating composition which is applicable to outdoor building structures or outdoor structures, and which is capable of forming a film having excellent properties in crack resistance, flexibility, stain resistance, water resistance, alkali resistance, acid resistance, and the like, with good durability.

Firstly, the present invention provides a coating composition prepared by mixing an organic solvent based coating composition with a silicone compound having an organofunctional group and hydrolyzable group in one molecule with an average degree of polymerization of 3 to 100, and containing (1) a unit D, as a silicon structural unit, represented by the general formula: $R^1R^2SiZ_2$, wherein $R^1$ represents an organofunctional group selected from the group consisting of epoxy group, mercapto group, (meth) acryloyl group, vinyl group, haloalkyl group and amino group; $R^2$ represents an alkyl group having 1 to 3 carbon atoms and Z represents a hydrolyzable group or a residual group bonded to other silicon atom through a siloxane bond, provided at least one Z being the residual group and/or a unit $T^1$, as a silicon structural unit, represented by the general formula: $R^1SiZ_3$, wherein $R^1$ and Z are defined as above, in an amount of 5 to 80 mol %, (2) a unit $T^2$ as a trifunctional silicon structural unit represented by the general formula: $R^3SiZ_3$, wherein $R^3$ represents an alkyl group having 1 to 3 carbon atoms and Z is defined as above, in an amount of 0.1 to 30 mol %, and (3) a unit Q as a tetrafunctional silicon structural unit represented by the general formula: $SiZ_4$, wherein Z is defined as above, in an amount of 10 to 94.9 mol %, provided that a total amount of the units $T^2$ and Q is in the range of 20 to 95 mol %, on the basis of a total amount of silicon atom contained in the silicone compound respectively (hereinafter referred to as a first invention of the present invention).

Secondly, the present invention provides a coating composition prepared by mixing an organic solvent based coating composition with a silicone compound which is a partial cohydrolysis•condensation product of a silane mixture of 100 parts by weight of (1) an alkoxysilane compound containing at least one organofunctional group selected from the group consisting of (meth)acryloyl group, vinyl group, haloalkyl group, amino group, epoxy group and mercapto group with 20 to 2000 parts by weight of (2) tetraalkoxysilane compound (hereinafter referred to as a second invention of the present invention).

DETAILED DESCRIPTION OF THE INVENTION

The present inventors found out that a coated film having a narrower contact angle to water is liable to prevent pollutants such as dust in atmosphere from adhering and shows good stain resistance during outdoor exposure. A hydrophilic film is such that a surface resistivity of the film is reduced, static adhesion of pollutants such as dust in atmosphere is prevented, and pollutants, which have been adhered, may easily be washed away by the action of rain or the like, because adhering power has been weakened.

A method of forming a hydrophilic surface on a film may include, for example, a method of adding a hydrophilic material (i.e. an antistatic agent, a condensation product between an alkylsilicate oligomer and a hydrolyzate of a silane coupling agent) to a coating composition. However, the above method is unsuitable for outdoor applications, because film performances such as water resistance, alkali resistance and the like become poor.

In a preferred embodiment of the first invention of the present invention, partial cohydrolysis•condensation of a silane coupling agent, alkyltrialkoxysilane and tetraalkoxysilane makes it possible to relatively and uniformly introduce the above components into the silicone compound, resulting in making it possible to form a coated film having excellent properties in water resistance, alkali resistance, etc.

In a first invention of the present invention the above alkyltrialkoxysilane component is one not referred in the above prior art. In the case of partial cohydrolysis of the silane coupling agent and tetraalkoxysilane without using the above alkyltrialkoxysilane, such drawbacks that cracks may develop on forming a film and that a coated film shows poor flexibility may be caused. Contrary thereto, use of the above alkyltrialkoxysilane component may improve the above drawbacks and makes it possible to form a film with high stain resistance.

In a second invention of the present invention, the partial cohydrolysis•condensation of the organofunctional group-containing alkoxysilane compound and tetraalkoxysilane compound makes it possible to uniformly introduce the above two components i.e. organofunctional group and hydrolyzable group into the silicone compound, resulting in forming a coated film having good properties in water resistance, alkali resistance and the like.

The organic solvent based coating composition used in the present invention may include any known uncrosslinkable coating composition and crosslinkable coating composition, which have conventionally been used for outdoor use in the art.

The uncrosslinkable coating composition and crosslinkable coating composition consist of a resin solution which is prepared by dissolving or dispersing a uncrosslinkable or crosslinkable organic resin into an organic solvent, and are such that an uncrosslinked or crosslinked film is formed at normal temperature or by heating.

Examples of the uncrosslinkable coating composition may include nitrocellulose lacquer, acrylic lacquer coating composition, vinyl resin coating composition, fluorocarbon resin coating composition and the like.

The crosslinkable coating composition may preferably include ones which are crosslinkable at normal temperature or by heating, and specifically may include oxidation-crosslinking type coating composition such as unsaturated fatty acid-modified alkyd resin coating composition; melamine-crosslinking type coating composition such as polyester melamine resin coating composition, acrylic melamine resin coating composition, flurocarbon melamine resin coating composition and the like; isocyanate-crosslinking type resin coating composition such as (blocked)polyisocyanate acrylic resin coating composition, (blocked)polyisocyanate polyester resin coating composition, (blocked)polyisocyanate fluorocarbon resin coating composition and the like; moisture-crosslinking type resin coating composition such as alkoxysilane group-containing acrylic resin coating composition and the like; epoxy-crosslinking type resin coating composition such as epoxy group-containing acrylic resin coating composition, and the like.

The organic solvent may include any ones which are capable of dissolving or dispersing the resin, and which are substantially unreactive with the functional group and hydrolyzable group in the silicone compound. Specific examples of the organic solvent may include acetates such as ethyl acetate, propyl acetate and the like, ketones such as methyl isobutyl ketone and the like, aromatic hydrocarbons such as xylene, toluene and the like, aliphatic hydrocarbons such as heptane and the like, alcohols such as propyl alcohol and the like, ethers such as ethyl cellosolve, butyl cellosolve and the like, and the like. These organic solvents may be used alone or in combination.

The organic solvent based coating composition of the present invention may optionally contain colorant, filler, anti-ragging agent, anti-cissing agent, ultraviolet light absorber, ultraviolet light stabilizer and the like.

The silicone compound used in the first invention of the present invention is a silicone compound having an organofunctional group and hydrolyzable group in one molecule with an average degree of polymerization of 3 to 100, and containing (1) a unit D, as a silicon structural unit, represented by the general formula: $R^1R^2SiZ_2$, wherein $R^1$ represents an organofunctional group selected from the group consisting of epoxy group, mercapto group, (meth) acryloyl group, vinyl group, haloalkyl group and amino group; $R^2$ represents alkyl group having 1 to 3 carbon atoms; and Z represents a hydrolyzable group or a residual group either of which is bonded to another silicon atom through a siloxane bond and/or a unit $T^1$, as a silicon structural unit, represented by the general formula: $R^1SiZ_3$, wherein $R^1$ and Z are defined as above, in an amount of 5 to 80 mol %, (2) a unit $T^2$ as a trifunctional silicon structural unit represented by the general formula: $R^3SiZ_3$, wherein $R^3$ represents an alkyl group having 1 to 3 carbon atoms and Z is defined as above, in an amount of 0.1 to 30 mol %, and (3) a unit Q as a tetrafunctional silicon structural unit represented by the general formula: $SiZ_4$, wherein Z is defined as above, in an amount of 10 to 94.9 mol %, provided that a total amount of the units $T^2$ and Q is in the range of 20 to 95 mol %, on the basis of a total amount of silicon atom contained in the silicone compound respectively.

The organofunctional group in the silicone structural unit (1) represented by the general formulas: $R^1R^2SiZ_2$ and/or $R^1SiZ_3$ and constituting the silicone compound used in the first invention functions so as to prevent the silicone compound from being desorbed from the coated film by forming a chemical bond due to a chemical reaction with the organic resin, forming a hydrogen bond due to a polar structure, or by producing a mutual action between the organofunctional group and the organic resin due to its affinity with the organic resin, and so forth. The organofunctional group may be bonded directly or through an organic substituent to silicon. The organofunctional group and organic substituent thereof may include any ones known as organic substitutents of the so-called silane coupling agent. Specific examples thereof may include γ-glycidoxypropyl group, β-(3,4-epoxycyclohexyl)-ethyl group, 5,6-epoxyhexyl group, 9,10-epoxydecyl group, γ-mercaptopropyl group, β-(mercaptomethylphenyl)ethyl group, 6-mercaptohexyl group, 10-mercaptodecyl group, mercaptomethyl group, γ-methacryloxypropyl group, γ-methacryloxymethyl group, γ-acryloxypropyl group, γ-acryloxymethyl group, vinyl group, 5-hexenyl group, 9-decenyl group, γ-chloropropyl group, γ-bromopropyl group, trifluoropropyl group, γ-aminopropyl group, and the like. These organofunctional groups and organic substituents thereof may be used alone or in combination. Examples of the hydrolyzable group represented by Z in the general formulas: $R^1R^2SiZ_2$ and $R^1SiZ_3$ may include methoxy group, ethoxy group, butoxy group, isopropenoxy group, acetoxy group, butanoxy group and the like. These hydrolyzable groups may be alone or in combination. Of these, methoxy group and ethoxy group are particularly preferred, because stain resistance occurs quickly due to the coating composition having good storage stability and good hydrolyzing property.

The residual group represented by Z in the general formulas: $R^1R^2SiZ_2$, $R^1SiZ_3$ and $SiZ_4$ is a silicone bond represented by the general formula:

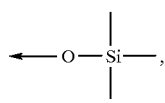

and may include, for example, ones represented by the following general formulas;

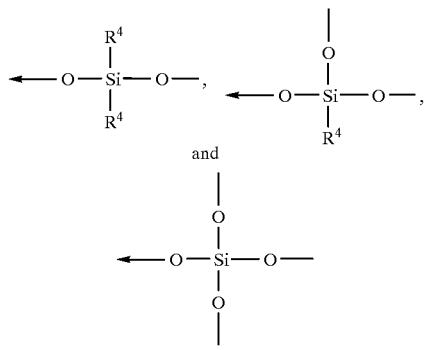

where $R^4$ represents alkyl group having 1 to 3 carbon atoms or hydroxyl group, and ←O represents oxygen to be bonded to Si in the general formulas of the above silicon structural units.

The silicon structural unit (1) containing these organofunctional groups may include the unit D containing two hydrolyzable groups which are capable of forming a siloxane bond by hydrolysis•condensation reaction, and the unit $T^1$ containing three hydrolyzable groups as above.

A content of the above organofunctional group-containing silicon structural unit (1) in the first invention is in the range of 5 to 80 mol % on the basis of a total amount of the silicon atom contained in the silicon compound. When the above content is less than 5 mol %, an ability to immobilize the silicone compound into the film may be insufficient, so that the silicone compound may easily be eluted out of the film. On the other hand, when the above content is more than 80 mol %, the silicone compound shows poor hydrophilic properties, resulting in making it impossible to obtain a film having good stain resistance. The above content is preferably in the range of 10 to 50 mol %.

The unit $T^2$ as a silicon structural unit represented by the general formula: $R^3SiZ_3$ in the silicone compound of the first invention is a unit having three hydrolyzable groups which are capable of finality forming silanol group or capable of forming siloxane bond by condensation with other silicon atom, and capable of imparting flexibility to a coated film without substantially reducing hydrophilic properties of the coated film. Absence of the above unit causes such drawbacks that density of crosslinking may be locally increased and that cracks may develop on the coated film.

An organic substituent $R^3$ in the general formula: $R^3SiZ_3$ is alkyl group having 1 to 3 carbon atoms, of these, methyl group provides good effect on stain resistance because of the least hydrophobic properties.

A content of the unit $T^2$ represented by the general formula: $R^3SiZ_3$ is in the range of 0.1 to 30 mol % on the basis of a total amount of silicon atom contained in the silicone compound. When the above content is less than 0.1 mol %, flexibility is not imparted to the coated film, and cracks may develop, resulting in making it impossible to obtain a good coated film. When the above content is more than 30 mol %, flexibility may sufficiently be imparted to the coated film, but hydrophobic properties may be too strong, resulting in showing insufficient hydrophilic properties and poor stain resistance. The content of the unit $T^2$ is preferably in the range of 1 to 25 mol %.

The unit Q as a silicon structural unit represented by the general formula: $SiZ_4$ in the silicon compound of the first invention is a unit having four hydrolyzable groups which are capable of finally forming silanol group or capable of forming siloxane bond by condensation with other silicon atom, and capable of imparting hydrophilic properties to the coated film.

A content of the unit Q is in the range of 10 to 94.9 mol % on the basis of a total amount of silicon atom contained in the silicone compound. When the above content is less than 10 mol %, insufficient hydrophilic properties makes it impossible to obtain a coated film having good properties in stain resistance, acid resistance, alkali resistance and the like. On the other hand, when the above content is more than 94.9 mol %, hydrophilic properties may sufficiently be imparted to the coated film, but hydrophilic properties is increased so that the silicone compound may be desorbed out of the coated film, resulting in lowering film performances. The content of the unit Q is preferably in the range of 25 to 90 mol %.

A total amount of the units $T^2$ and Q is in the range of 20 to 95 mol % on the basis of a total amount of silicone atom contained in the silicone compound.

The silicone compound in the first and second inventions has an average degree of polymerization of 3 to 100.

A degree of polymerization less than 3 causes the silicone compound to volatilize out of the coated film during the course of curing of the coated film, makes it impossible to impart satisfactory hydrophilic properties to the surface of the coated film, and may cause the silicone compound to elute out of the coated film, resulting in making it impossible to obtain a coated film having good properties in stain resistance and durability.

A degree of polymerization more than 100 causes poor dispersion of the silicone compound in the coated film, makes it difficult to form a uniform film, resulting in showing poor properties in finish, stain resistance, durability and the like. The degree of polymerization is preferably in the range of 5 to 80.

The silicone compound of the first invention may be prepared by any conventional processes, provided the above conditions are satisfied, and the following processes are exemplified without limitation.

(a) A process which comprises subjecting a silane coupling agent as a component having the silicon structural unit (1) i.e. the units D and/or $T^1$ (the same shall apply hereinafter), an alkyl trifunctional silane as a component having the silicon structural unit (2) i.e. the unit $T^2$ (the same shall apply hereinafter), and tetrafunctional silane as a component having the silicon structional unit (3) i.e. the unit Q (the same shall apply hereinafter) to a partial cohydrolysis•condensation in the presence of a hydrolysis•condensation catalyst.

(b) A process which comprises subjecting alkyl trifunctional silane and tetrafunctional silane to partial cohydrolysis to obtain an oligomer or a resin, followed by reacting with a silane coupling agent or prehydrolyzate.

(c) A process which comprises subjecting a silane coupling agent and alkyl trifunctional silane to cohydrolysis to obtain a cohydrolyzate, followed by reacting with a tetrafunctional silane or a partial cohydrolyzate thereof.

Of these processes, the process (a) subjecting the silane compounds as the starting materials to partial cohydrolysis•condensation is particularly preferred because of making it possible to introduce the unit D containing organofunctional group, unit $T^1$ containing organofunctional group, unit $T^2$ and unit Q uniformly into the silicone compound, and making it possible to easily coexist improvements in film performances such as stain resistance, acid resistance, alkali resistance and the like and in durability thereof with prevention of cracks.

In the above partial cohydrolysis•condensation, a degree of cohydrolysis is so intimately correlated with a degree of corresponding polymerization that, for example, zero degree of hydrolysis corresponds to zero degree of polymerization, and 100% of the degree of hydrolysis results that the degree of polymerization is so increased that gelling takes place, and is controlled so that an average degree of polymerization of the silicone compound can be in the range of 3 to 100.

The silane coupling agent, alkyl trifunctional silane and tetrafunctional silane used as the starting materials may include conventionally used ones, provided that substituents and hydrolyzable groups satisfy the above-mentioned conditions. The silane coupling agent used may include trifunctional ones represented by the unit $T^1$ and bifunctional ones represented by the unit D.

The hydrolysis•condensation catalyst used in the above partial hydrolysis•condensation reaction may include conventionally used ones, and specifically include, for example, organic acids such as acetic acid, butyric acid, maleic acid, citric acid and the like; inorganic acids such as chloric acid, nitric acid, phosphoric acid, sulfuric acid and the like; basic compounds such as triethylamine; organomethallic salts such as tetrabutyl titanate, dibutyltin dilaurate and the like; fluorine-containing compounds such as potassium fluoride (KF), ammonium fluoride ($NH_4F$) and the like; and the like. The above catalyst may be used alone or in combination. An amount of the catalyst used is preferably in the range of 0.0001 to 1 mol %.

The silicone compound used in the second invention of the present invention may be obtained by subjecting a mixture of an alkoxysilane compound containing at least one organofunctional group selected from the group consisting of (meth)acryloyl group, vinyl group, haloalkyl group, amino group, epoxy group and mercapto group (hereinafter referred to as an organofunctional group-containing alkoxysilane compound) with a tetraalkoxysilane compound to partial cohydrolysis•condensation.

The organofunctional group-containing alkoxysilane compound as the starting material in the second invention may include ones having the organofunctional group directly bonded to silicone atom and ones having the organofunctional group bonded to silicone atom through bivalent hydrocarbon group having 1 to 10 carbon atoms, and may include conventionally used ones. Specific examples thereof may include
γ-methacryloxypropyltrimethoxysilane,
γ-methacryloxypropyltriethoxysilane,
γ-methacryloxypropyltributoxysilane,
γ-methacryloxypropylmethyldimethoxysilane,
γ-methacryloxypropylmethyltriethoxysilane,
γ-acryloxypropyltrimethoxysilane,
γ-acryloxypropyltriethoxysilane,
γ-acryloxypropylmethyldimethoxysilane,
γ-methacryloxymethyltrimethoxysilane
γ-acryloxymethyltrimethoxysilane,
vinyltrimethoxysilane, vinyltriethoxysilane,
vinyltributoxysilane,
vinylmethyldimethoxysilane, 5-hexenyltrimethoxysilane,
9-decenyltrimethoxysilane, styryltrimethoxysilane,
γ-chloropropyltrimethoxysilane,
γ-bromopropyltrimethoxysilane,
trifluoropropyltrimethoxysilane,
nonafluorohexyltrimethoxysilane,
γ-aminopropyltrimethoxysilane,
γ-aminopropyltriethoxysilane,
γ-aminopropyltributoxysilane,
γ-aminopropylmethyldimethoxysilane,
γ-aminopropylmethyldiethoxysilane,
N-(β-aminoethyl)-γ-aminopropyltrimethoxysilane,
N-(β-aminoethyl)-γ-aminopropyltriethoxysilane,
N-(β-aminoethyl)-γ-aminopropyltributoxysilane,
N-(β-aminoethyl)-γ-aminopropylmethyldimethoxysilane,
N-phenyl-γ-aminopropyltrimethoxysilane,
γ-glycidoxypropyltrimexhoxysilane,
γ-glycidoxypropyltriethoxysilane,
γ-glycidoxypropyltributoxysilane,
γ-glycidoxypropyltriisopropenoxysilane,
γ-glycidoxypropylmethyldimethoxysilane,
γ-glycidoxypropylmethyldiethoxysilane,
β-(3,4-epoxycyclohexyl)ethyltrimethoxysilane,
β-(3,4-epoxycyclohexyl)ethyltriethoxysilane,
β-(3,4-epoxycyclohexyl)ethylmethyldimethoxysilane,
β-(3,4-epoxycyclohexyl)ethylmethyldiethoxysilane,
5,6-epoxyhexyltrimethoxysilane,
9,10-epoxydecyltrimethoxysilane,
γ-mercaptopropyltrimethoxysilane,
γ-mercaptopropyltriethoxysilane,
γ-mercaptopropyltributoxysilane,
γ-mercaptopropylmethyldimethoxysilane,
γ-mercaptopropylmethyldiethoxysilane,
β-mercaptomethylphenylethyltrimethoxysilane,
mercaptomethyltrimethoxysilane,
6-mercaptohexyltrimethoxysilane,
10-mercaptodecyltrimethoxysilane, and the like.

These organofunctional group-containing alkoxysilane compounds may be used alone or in combination.

Of these, from the standpoints of good film performances in stain resistance, durability and the like,
γ-methacryloxypropyltrimethoxysilane,
γ-acryloxypropyltrimethoxysilane,
vinyltrimethoxysilane,
γ-chloropropyltrimethoxysilane,
trifluoropropyltrimethoxysilane,
γ-aminopropyltriethoxysilane,
N-(β-aminoethyl)-γ-aminopropyltrimethoxysilane,
γ-glycidoxypropyltrimethoxysilane,
γ-glycidoxypropyltriethoxysilane,
γ-glycidoxypropylmethyldimethoxysilane,
γ-mercaptopropyltrimethoxysilane,
γ-mercaptopropyltriethoxysilane, and
γ-mercaptopropylmethyldimethoxysilane are preferred.

The above organofunctional groups function in the same manner as that in the silicon structural unit (1) of the silicone compound in the first invention.

Examples of the tetraalkoxysilane compound as another starting material may include tetramethoxysilane, tetraethoxysilane, tetraisopropoxysilane, and tetrabutoxysilane.

These compounds may be used alone or in combination.

Of these, use of tetramethoxysilane and tetramethoxysilane is particularly preferred from such standpoints that the alkoxysilane group is easily hydrolyzed to form silanol group, resulting in forming a coated film having good stain resistance.

A mixing ratio of the above organofunctional group-containing alkoxysilane compound and tetraalkoxysilane is such that tetraalkoxysilane is preferably in the range of 20 to 2000 parts by weight per 100 parts by weight of the organofunctional group-containing alkoxysilane compound. An amount of less than 20 parts by weight undersirably reduces hydrophilic properties of the cohydrolysis•condensation product, resulting in showing poor properties in stain resistance, acid resistance and the like. An amount of more than 2000 parts by weight undesirably causes poor properties in affinity and reactivity with the organic resin, and makes insufficient an ability to immobilize the silicone compound into the coated film, resulting in that the silicone compound may easily be desorbed out of the coated film. The above amount of tetraalkoxysilane is particularly in the range of 50 to 1000 parts by weight.

The silicone compound in the second invention may be prepared by the conventional process, for example, by a process which comprises adding water to a mixture of the organofunctional group-containing alkoxysilane compound and tetraalkoxysilane compound, followed by subjecting to partial cohydrolysis•condensation reaction in the presence of a hydrolysis catalyst.

In the above partial cohydrolysis•condensation, a degree of partial cohydrolysis is controlled so that an average degree of polymerization of the silicone compound can be in the range of 3 to 100 as in the first invention.

The hydrolysis•condensation catalyst used in the above partial cohydrolysis•condensation reaction may include the same ones as in the first invention, and may be used in the same amount as in the first invention. Of the catalysts exemplified in the first invention, the fluorine-containing compound is suitable for the preparation of a silicone compound containing silanol group in a small amount because of an advantageous function to promoto the condensation of highly reactive silanol group, and further because the use thereof improves storage stability of a coating composition.

On carrying out the partial cohydrolysis•condensation reaction in the present invention, if needed, an organic solvent may be used. Examples of the solvent used may include alcohols such as methanol, ethanol, isopropanol, t-butanol and the like; ketones such as acetone, methyl isobutyl ketone and the like; ethers such as dibutyl ether; esters such as ethyl acetate; aromatic hydrocarbons such as toluene; and the like. Of these organic solvents such as methonol, ethanol, acetone and the like are preferred.

An amount of water used in the partial cohydrolysis•condensation reaction of the present invention may be determined depending on an intended degree of polymerization. A strict determination of the above amount is necessary because addition of an excess water causes alkoxy group to be broken, and finally causes gelation. The use of the fluorine-containing compound as the catalyst is preferable in that the fluorine-containing compound has an ability to completely proceed the hydrolysis•condensation, resulting in making it possible to determine a degree of polymerization depending on an amount of water added, and to arbitarily predetermine a molecular weight. That is, in the case of the preparation of an intended silicone compound having an average degree of polymerization of M, use of (M-1) mols of water relative to M mols of alkoxysilane compound is sufficient.

Use of other catalysts needs use of water in an amount a little more than the above.

The partial cohydrolysis•condensation reaction in the present invention may be carried out at a temperature range of room temperature to 150° C. A temperature lower than room temperature reduces a reaction rate so as to be impractical. A temperature higher than 150° C. undesirably causes thermal decomposition of organic substituents such as the organofunctional group.

A mixing amount of the silicone compound in the present invention is desirably in the range of 0.1 to 50 parts by weight, preferably 1.0 to 20 parts by weight per 100 parts by weight of an organic resin solid content in the organic solvent based coating composition. A mixing amount less than 0.1 part by weight makes it impossible to obtain a coated film having satisfactory stain resistance. On the other hand, a mixing amount more than 50 parts by weight undersirably results a coated film having poor properties in water resistance, acid resistance, alkali resistance and the like.

The coated film formed from the coating composition of the present invention shows a gradually reducing contact angle to water by an action of rain or the like during outdoor exposure. That is, a finally reduced contact angle to water of the coated film subjected to outdoor exposure can be forecast by subjecting a surface of a coated film prior to outdoor exposure to an acid treatment under such conditions that the coated film is dipped into 2.5 at % sulfuric acid water at 20° C. for 24 hours followed by washing the sulfuric acid water adhered thereonto with water and drying followed by measuring a contact angle to water of the surface of the resulting coated film.

The coating composition of the present invention is preferably such that a surface of a coated film formed therefrom is subjected to an acid treatment under such conditions that the coated film is dipped into a 2.5 wt % sulfuric acid water at 20° C. for 24 hours followed by washing the sulfuric acid water adhered thereonto with water and drying, and a contact angle to water of the surface of the resulting coated film is in the range of 70 degree or less, preferably 10 to 60. A contact angle more than 70 degree undesirably reduces stain resistance, and a contact angle less than 10 degree undesirably reduces film performances in water resistance, acid resistance, alkali resistance and the like.

The coating composition of the present invention is capable of forming a coated film by coating the above coating composition onto a substrate, followed by drying at room temperature or by heating and drying. Examples of the substrate may include inorganic substrates such as slate, concrete and the like; methallic substrates such as steel, aluminum, zinc, stainless steel, ones obtained by subjecting the above metals to a surface treatment with chromic acid, zinc phosphate and the like; plastic substrates such as polyvinylchloride, polyethyleneterephih alate, polyethylene and the like; and the like. If needed, the substrate used may also include ones obtained by coating a known primer, intercoating, topcoating and the like onto the above substrate.

Examples of a coating method used in the present invention may include brushing, spray coating, roller coating, dip coating and the like. A coating amount as a film thickness is desirably in the range of 1 to 100 $\mu$m, preferably 10 to 60 $\mu$m.

Drying of a coated film in the present invention may be carried out by selecting suitable conditions depending on the kind of the coating composition, but generally may sufficiently be carried out under such conditions as in the range of one hour to one week or so for drying at room temperature, and as in the range of 30 seconds to one hour for drying by heating at 60 to 300° C.

The coated film obtained from the coating composition of the present invention shows excellent properties in stain resistance, water resistance, acid resistance, alkali resistance and the like under outdoor exposure. A surface of the coated film after outdoor exposure shows such characteristics that a contact angle to water is remarkably reduced to show hydrophilic properties. That is, the silicone compound in the coated film is reacted with moisture, rain particularly acid water under outdoor exposure environment, resulting in that a contact angle to water is reduced by action of silanol group produced by hydrolysis to show hydrophilic properties. The hydrophilic film reduces adhesion properties of an organic substance such as oil or the like as one of the stain components in atmosphere, so that the stain component having been adhered onto the film surface may easily be washed away by rain, resulting in making it possible to form a coated film having excellent stain resistance. On the other hand, the hydrophilic film reduces a surface resistivity and prevents static adhesion of sand dust, dust, etc. as stain components in atmosphere, resulting in making it possible to form a coated film having excellent stain resistance.

The coated film formed from the coating composition of the present invention is such that the contact angle to water is early reduced under outdoor exposure, resulting in reaching an equibrium in 3 to 6 months. A contact angle to water at the above equibrium is approximately equal to that obtained by an acid treatment of dipping a coated film prior to outdoor exposure into a 2.5 at % sulfuric acid water for 24 hours. That is, measurement of the contact angle to water, which is obtained by dipping the coated film prior to outdoor exposure into the 2.5 wt % sulfuric acid water for 24 hours, makes it possible to forecast a stain condition which would finally be reached after outdoor exposure.

Particularly, according to the coating composition in the first invention of the present invention, the organofunctional group derived from the silicone compound may strongly be bonded to the organic resin by reaction, hydrogen bonding or high compatibility therewith and may prevent the silicone compound from being eluted out of the coated film, resulting in improving film performances in stain resistance, boiling water resistance, acid resistance, alkali resistance and the like. Moreover, althonyl the silicone compound is originally rigid, addition of a certain amount of unit $T^2$ makes it possible to provide a coated film having good flexibility and to prevent crocks which may develop on the surface of the coated film.

Particularly according to the coating composition in the second invention of the present invention, the organofunctional group derived from the silicone compound acts so as to be strongly bonded to a polymer in the coating composition and the silicone compound contains an organofunctional group-free component in an extremely small amount in the molecule, resulting in making it possible to control aluation and hydrolysis under environments such as water, acid solution, alkali solution and the like, and to impart excellent durability to film performances such as stain resistance, water resistance, acid resistance, alkali resistance and the like.

The present invention will be explained more in detail by the following Examples and Comparative Examples, in which "part" and "%" are all by weight. Preparation of both organofunctional group and alkoxy group-containing silicone compounds:

Preparation of Silicone Compound $A_1$

A 1000 ml reactor equipped with thermometer, nitrogen inlet and dropping funnel was charged with 47.3 g (0.20 mol) of γ-glycidoxypropyltrimethoxysilane, 114.0 g (0.75 mol) of tetramethoxysilane, 6.8 g (0.05 mol) of methyltrimethoxysilane, 160 g (5 mol) of methanol and 0.06 g (0.001 mol) of KF, followed by slowly dropping 17.1 g (0.95 mol) of water with agitation, stirring at room temperature for 3 hours, heating with agitation for 2 hours under methanol reflux, removing a low-boiling fraction by vacuum distillation, and by filtering to obtain 113 g of a colorless, transparent liquid product (partial cohydrolysis•condensation process).

The resulting product had an average degree of polymerization of 20.5 as a result of the gas permeation chromatography (hereinafter referred to as GPC) measurement to be substantially the same as a predetermined degree of polymerization of 20.

The above product had an epoxy equivalent of 625 g/mol (predetermined epoxy equivalent: 622 g/mol) as the result of measurement according to the epoxy ring opening process by use of hydrochloric acid, resulting in showing that epoxy group was introduced in the predetermined amount. An amount of alkoxy group for the above product was determined by the alkali cracking process to be 45.5% (theoretical value: 46.1%). From the result of $^1$H-NMR measurement the above product had such a structure as represented by the following average composition formula:

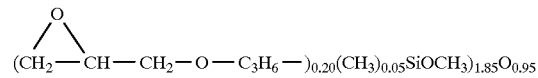

The silicone compound as the above product is referred to as Compound $A_1$.

Preparation Examples of Compounds $B_1$ to $G_1$, and Comparative Compounds $H_1$ and $J_1$ Compounds $B_1$ to $G_1$, and Comparative Compounds $H_1$ and $J_1$ were prepared in the same manner as in Compound $A_1$ except that respective formulations were varied as shown Table 1, in which respective mixing amounts for Compounds $A_1$ to $J_1$ are represented by an amount by mol.

In place of the above partial cohydrolysis•condensation process (hereinafter referred to as Preparation Process I), the following preparation processes II to IV were carried out.

Preparation Process II

A process which comprises subjecting an organofunctional group-containing alkoxysilane and alkoxysilane as the unit $T^2$ to cohydrolysis in advance, followed by subjecting to condensation reaction with tetraalkoxysilane.

Preparation Process III

A process which comprises subjecting tetraalkoxysilane and alkoxysilane as the unit $T^2$ to cohydrolysis in advance, followed by subjecting to condensation reaction with an organofunctional group-containing alkoxysilane.

Preparation Process IV

A process which comprises separately subjecting respective components to hydrolysis in advance, followed by mixing resulting respective components, and by subjecting to condensation reaction.

EXAMPLES 1–9 AND COMPARATIVE EXAMPLES 1–6

Coating compositions of Examples 1–9 and Comparative Examples 1–6 were prepared according to formulations in a unit of part by weight as illustrated in Table 2, in which "FUCARON white Enamel" is a trademark of an uncrosslinkable fluorocarbon resin based topcoating composition having a resin solid content of 35%, and marketed by Kansai Paint Co., Ltd.

FUCARON FR Primer (Trademark, uncrosslinkable fluorocarbon resin based undercoating composition marketed by Kansai Paint Co., Ltd.) was coated to be a dry film thickness of 10 μm by air spray coating onto a zinc phosphate-treated galvanized steel sheet (zinc plating: 130 g/m² in one side, 1.2 mm in thickness). After leaving to stand at 20° C. for 10 minutes, coating compositions of Examples 1–9 and Comparative Examples 1–6 were coated to be a dry film thickness of about 25 μm by air spray coating, followed by drying at 235° C. for 15 minutes to prepare respective test panels. Test results of film performances are shown in Table 2.

EXAMPLES 10–18 AND COMPARATIVE EXAMPLES 7–12

Coating compositions of Examples 10–18 and Comparative Examples 7–12 were prepared according to formulations in a unit of part by weight as illustrated in Table 3, in which "RETAN PAQ white Enamel" is a trademark of polyisocyanate acrylic resin topcoating composition having a resin solid content of 36%, and marketed by Kansai Paint Co., Ltd.

RETAN CW Primer (Trademark, epoxy resin based undercoating composition marketed by Kansai Paint Co., Ltd.) was coated to be a dry film thickness of about 30 μm by air spray coating onto a zinc phosphate-treated galvanized steel sheet (zinc plating: 130 g/m² in one side, 1.2 mm in thickness), followed by drying at 80° C. for 20 minutes to obtain a substrate. Next, onto the substrate, coating compositions of Examples 10–18 and Comparative Examples 7–12 were coated to be a dry film thickness of about 30 μm by air spray coating, followed by drying at 80° C. for 30 minutes to obtain respective test panels. Test results of film performances are shown in Table 3.

EXAMPLES 19–27 AND COMPARATIVE EXAMPLES 13–18

Coating compositions of Examples 19–27 and Comparative Examples 13–18 were prepared according to formulations in a unit of part by weight as illustrated in Table 4, in which "NEO FTALIT White Example" is a trademark of unsaturated fatty acid-modified alkyd resin based topcoating composition having a resin solid content of 32% and marketed by Kansai Paint Co., Ltd.

RUSTITE NC (Trademark, unsaturated fatty acid-modified alkyd resin based undercoating composition marketed by Kansai Paint Co., Ltd.) was coated to be a dry film thickness of about 30 μm by air spray coating onto a #320 sandpaper-treated polished mild steel sheet (SPCC: 0.8 mm), followed by leaving to stand at 20° C. for 10 minutes, coating coating compositions of Examples 19–27 and Comparative Examples 13–18 to be a dry film thickness by air spray coating, and by drying at 20° C. for 7 days to obtain respective test panels. Test results of film performances are shown in Table 4.

PREPARATION OF SILICONE COMPOUND A₂

A 2,000 ml reactor equipped with a thermometer, nitrogen inlet and dropping funnel was charged with 248 g (1.00 mol) of γ-methacryloxypropyltrimethoxysilane, 152 g (1.00 mol) of tetramethoxysilane, 320 g (10 mol) of methanol and 0.04 g (0.001 mol) of NH₄F, followed by slowly dropping 28.8 g (1.60 mol) of water with agitation at room temperature, stirring at room temperature for 3 hours, heating with agitation for 2 hours under methanol reflux, removing a low-boiling fraction by vacuum distillation, and filtering to obtain 266 g of colorless transparent liquid product(partial cohydrolysis•condensation process).

The resulting product had an average degree of polymerization of 5.3 as a result of GPC measurement to be substantially the same as a predetermined degree of polymerization of 5.0.

An amount of alkoxy group for the above product was determined by the alkali cracking process to be 35.7 wt % (predetermined amount: 36.1 wt %), resulting in that the alkoxy group remained as in the predetermined amount.

From the result of ¹H-NMR measurement, the above product had such a structure as represented by the following average composition formula:

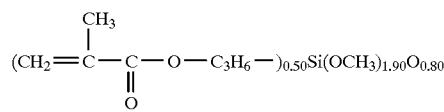

The silicone compound as the above product is referred to as Compound A₂.

Preparation Examples of Compounds B₂ to E₂ and Comparative Compounds F₂ and G₂

In the same manner as in Compound A₂, kinds and predetermined amounts of organofunctional group-containing alkoxysilane, tetraalkoxysilane and catalyst were varied to prepare Compounds B₂ to E₂ and Comparative Compounds F₂ and G₂ having predetermined formulations as shown in Table 5, in which respective mixing amounts for Compounds A₂ to G₂ are represented in an amount by mol.

In place of the partial cohydrolysis•condensation process (hereinafter referred to as Preparation Process I) in the second invention of the present invention, the following preparation processes II and III were carried out.

Preparation Process II

A process which comprises subjecting the orgnofunctional group-containing alkoxysilane and an oligomer of tetraalkoxysilane to condensation reaction.

Preparation Process III

A process which comprises hydrolyzing the organofunctional group-containing alkoxysilane, followed by subjecting to condensation reaction with an oligomer of tetraalkoxysilane.

EXAMPLES 28–34 AND COMPARATIVE EXAMPLES 19–23

Coating compositions of Examples 28–34 and Comparative Examples 19–23 were prepared according to formulations (part by weight) as shown in Table 6, in which "FUCARON White Enamel" is as in Example 1. Test panels were prepared by coating the above coating compositions in the same manner as in Example 1.

Test results of film performances are shown in Table 6.

EXAMPLES 35–41 AND COMPARATIVE EXAMPLES 24–28

Coating compositions of Examples 35–41 and Comparative Examples 24–28 were prepared according to the formulations (in part by weight) as shown in Table 7, in which "RETAN PAQ White Enamel" is as in Example 10. Test panels were prepared by coating the above coating compositions in the same manner as in Example 10.

Test results of film performances are shown in Table 7.

EXAMPLES 42–48 AND COMPARATIVE EXAMPLES 29–33

Coating compositions of Examples 42–48 and Comparative Examples 27–33 were prepared according to formulations (in part by weight) as shown in Table 8, in which "NEO FTALIT White Enamel" is as in Example 19. Test panels were prepared by coating the above coating compositions in the same manner as in Example 19.

Test results of film performances are shown in Table 8.

Preparation of Silicone Compound $A_3$

A 2000 ml reactor equipped with thermometer, nitorogen inlet and dropping funnel was charged with 236 g (1.00 mol) of γ-glycidoxypropyltrimethoxysilane, 152 g (1.00 mol) of tetramethoxysilane, 320 g (10 mols) of methanol and 0.06 g (0.001 mol) of KF, followed by slowly dropping 28.8 g (1.60 mols) of water with agitation, stirring at room temperature for 3 hours, heating with agitation for 2 hours under methanol reflux, removing a low boiling fraction by vacuum distillation, and by filtering to obtain 266 g of a colorless, transparent liquid product.

The resulting product had an average degree of polymerization of 5.3 as the result of GPC measurement to be substantially the same as a predetermined degree of polymerization of 5.0.

The above product had an epoxy equivalent of 319 g/mol (predetermined epoxy equivalent: 314 g/mol) as the result of measurement according to the epoxy ring opening process by use of hydrochloric acid, resulting in showing that epoxy group was introduced in the predetermined amount. An amount of alkoxy group for the above product was determined by the alkali cracking process to be 36.8 wt % (predetermined amount: 37.4 wt %), resulting in showing that alkoxy group was introduced in the predetermined amount.

From the result of $^1$H-NMR measurement, the above product had such a structure as represented by the following average composition formula:

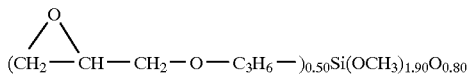

as predetermined.

The silicone compound as the above product is referred to as Compound $A_3$.

Preparation Examples of Compounds $B_3$ to $D_3$ and Comparative Compounds $E_3$ and $F_3$ In the same manner as in Compound $A_3$, kinds and predetermined amounts of epoxy functional group-containing alkoxysilane, tetralkoxysilane and catalyst were varied to prepare Compounds $B_3$ to $D_3$ having predetermined formulations as shown in Table 9, in which respective mixing amounts for Compounds $A_3$ to $D_3$ are represented in an amount by mol (partial cohydrolysis•condensation process).

Example 49 was repeated except that the following preparation processes II and III were employed in place of the partial cohydrolysis•condensation process (preparation process I) in the second invention of the present invention with the same composition as in Example 49 to obtain Comparative Compounds $E_3$ and $F_3$. In Table 9, mixing amounts of Compounds $E_3$ and $F_3$ are represented in an amount by mol.

Comparative Preparation Example of Compound $E_3$ (Preparation Process II)

Reaction with tetraalkoxysilane oligomer

Reaction of Example 49 was repeated except that 1.00 mol of an average tetramer of tetramethoxysilane in place of monomer of tetralkoxysilane, 0.85 mol (1.60−0.75=0.85 mol) of water and HCl as the catalyst were used to obtain 258 g of Compound $E_3$ as a colorless, transparent liquid.

An epoxy equivalent was measured to be 429 g/mol, resulting in showing that epoxy group has been broken to some extent.

The result of GPC measurement showed molecular weight distribution composed of main two peaks, resulting in that the reaction product was found to be short of uniformity.

Comparative Preparation Example of Compound $F_3$ (Preparation Process III)

Preparation by reaction of tetraalkoxysilane oligomer with silane coupling agent oligomer Reaction of Example 49 was repeated except that 1.00 mol of tetramethoxysilane tetramer in place of tetramethoxysilane monomer, a hydrolyzate obtained by hydrolyzing γ-glycidoxypropyltrimethoxysilane with 3.00 mol of water in advance in place of γ-glycidoxypropyltrimethoxysilane monomer and hydrochloric acid as a caused catalyst were used to obtain 271 g of Compound $F_3$ as a colorless, transparent liquid.

An epoxy equivalent was measured to be 693 g/mol and to be introduced in a much smaller amount than a predetermined amount.

However, the result of GPC measurement showed an average degree of polymerization to be considerably high.

EXAMPLES 49–54 AND COMPARATIVE EXAMPLES 34–38

Coating compositions of Examples 49–54 and Comparative Examples 34–38 were prepared according to formulations (in part by weight) shown in Table 10, in which "FUCARON White Enamel" is as in Example 1. Test panels were prepared by coating the above coating compositions in the same manner as in Example 1.

Test results of film performances are shown in Table 10.

EXAMPLES 55–60 AND COMPARATIVE EXAMPLES 39–43

Coating compositions of Examples 55–60 and Comparative Examples 39–43 were prepared according to the formulations (in part by weight) as shown in Table 11, in which "RETAN PAQ White Enamel" is as in Example 10. Test panels were prepared by coating the above coating compositions in the same manner as in Example 10.

Test results of film performances are shown in Table 11.

EXAMPLES 61–66 AND COMPARATIVE EXAMPLES 44–48

Coating compositions of Examples 61–66 and Comparative Examples 44–48 were prepared according to formulations (in part by weight) as shown in Table 12, in which "NEO FTALIT White Enamel" is as in Example 19. Test panels were prepared by coating the above coating compositions in the same manner as in Example 19.

Test results of film performances are shown in Table 12.

Preparation Example of Silicone Compound $A_4$ containing mercapto functional group and alkoxy group A 1000 ml reactor equipped with thermometer, nitrogen inlet and dropping funnel was charged with 196 g (1.00 mol) of γ-mercaptopropyltrimethoxysilane, 152 g (1.00 mol) of tetramethoxysilane, 320 g (10 mols) of methanol and 0.06 g (0.001 mol) of KF, followed by slowly dropping 28.8 g (1.60 mols) of water at room temperature with agitation, stirring at room temperature for 3 hours, heating with agitation for 2 hours under methanol reflux, removing a low-boiling fraction by vacuum distillation, a nd by filtering to obtain 231 g of a colorless, transparent liquid product.

The resulting product had an average degree of polymerization of 5.4 as the result of GPC measurement to be substantially the same as a predetermined degree of polymerization of 5.0.

An amount of alkoxy group for the above product was determined by the alkali cracking process to be 42.0 wt % (predetermined amount: 42.9 wt %), resulting in showing that alkoxy group was introduced in the predetermined amount.

An active hydrogen in the above product was determined by use of methyl Grignard reagent to be $3.51 \times 10^{-3}$ mol/g [an amount of active hydrogen divided from mercapto group (predetermined amount)=$3.64 \times 10^{-3}$ mol], resulting in showing that mercapto group was introduced substantially in the predetermined amount.

From the result of $^1$H-NMR measurement, the above product had such a structure as represented by the following average composition formula:

$(HS-C_3H_6-)_{0.50}Si(OCH_3)_{1.90}O_{0.80}$ as predetermined.

The silicone compound as the above product is referred to as Compound $A_4$.

Preparation Examples of Compounds $B_4$ to $D_4$ and Comparative Compounds $E_4$ and $F_4$ In the same manner as in Compound $A_4$, kinds and predetermined amounts of mercapto functional group-containing alkoxysilane, tetraalkoxysilane and catalyst were varied to prepare Compounds $B_4$ to $D_4$ having formulations as shown in Table 13, in which respective mixing amounts of Compounds $A_4$ to $D_4$ are represented in an amount by mol (partial cohydrolysis•condensation process)

In place of the partial cohydrolysis•condensation process (preparation process I) in the second invention of the present invention, the following preparation processes at and in were used with the same composition as in Example 67 to obtain Comparative Compounds $E_4$ and $F_4$. In Table 13, respective mining amounts of Compounds $E_4$ and $F_4$ are represented in an amount by mol.

Comparative Preparation Example of Compound $E_4$ (Preparation Process II)

Reaction with tetraalkoxysilane oligomer

Reaction of Example 67 was repeated except that 1.00 mol of tetramethoxysilane tetramer in place of tetramethoxysilane monomer, 0.85 mol (1.60-0.75=0.85 mol) of water for hydrolysis and hydrochloric acid as a catalyst used in. Combination were used to obtain 228 g of Compound $E_4$ as a colorless transparent liquid.

An amount of an active hydrogen was measured to be $4.66 \times 10^{-3}$ mol/g, resulting in that mercapto group was not completely introduced.

The result of GPC measurement showed a molecular weight distribution composed of mainly two peaks, resulting in showing that the above reaction product lacks uniformity.

Comparative Preparation Example of Compound $F_4$ (Preparation Process III)

Preparation by the reaction of tetraalkoxysilane oligomer with silane coupling agent oligomer Reaction of Example 67 was repeated except that 1.00 mol of tetramethoxysilane tetramer on an average in place of tetramethoxysilane monomer, a hydrolyzate obtained by hydrolyzing γ-mercaptopropyltrimethoxysilane with 3.00 mols of water in place of γ-mercaptopropyltrimethoxysilane and hydrochloric acid as the catalyst were used to obtain 242 g of Compound $F_4$ as a colorless, transparent liquid.

An amount of active hydrogen was measured to be $3.68 \times 10^{-3}$ mol/g, resulting in showing that mercapto group has almost completely been introduced.

However, the result of GPC measurement showed an average degree of polymerization of 49 to be considerably high.

EXAMPLES 67–72 AND COMPARATIVE EXAMPLES 49–53

Coating compositions of Examples 67–72 and Comparative Examples were prepared according to formulations (in part by weight) as shown in Table 14, in which "FUCARON White Enamel" is as in Example 1. Test panels were prepared by coating the above coating compositions in the same manner as in Example 1.

Test results of film performances are shown in Table 14.

EXAMPLES 73–78 AND COMPARATIVE EXAMPLES 54–58

Coating compositions of Examples 73–78 and Comparative Examples 54–58 were prepared according to formulations (in part by weight) as shown in Table 15, in which "RETAN PAQ White Enamel" is as in Example 10. Test panels were prepared by coating the above coating compositions in the same manner as in Example 10.

Test results of film performances are shown in Table 15.

EXAMPLES 79–84 AND COMPARATIVE EXAMPLES 59–63

Coating compositions of Examples 79–84 and Comparative Examples 59–63 were prepared according to formulations (in part by weight) as shown in Table 16, in which "NEO FTALIT White Enamel" is as in Example 19. Test panels were prepared by coating the above coating compositions in the same manner as in Example 19.

Test results of film performances are shown in Table 16.

In Tables 2–4, 6–8, 10–12 and 14–16, *1~*13 mean as follows.

*1: Trademark of lower condensate of tetramethyl silicate marketed by Colcote Co., Ltd.

*2: Trademark of γ-glycidoxypropyltrimethoxysilane marketed by Shin-Etsu Chemical Co., Ltd.

*3: Trademark of γ-mercaptopropyltrimethoxysilane marketed by Shin-Etsu Chemical Co., Ltd.

*4: Contact angle to water

It shows a value obtained by such a measuring method that a test panel is dipped into a 2.5 wt % aqueous sulfuric acid solution to be treated at 20° C. for 24 hours followed by washing the aqueous sulfuric acid solution adhered onto the film with water, drying, dropping a 0.03 ml water drop of deionized water onto the surface of the film, and measuring a contact angle of the water drop three minutes after at 20° C. by use of a Contactangle meter DCAA marketed by Kyowa Chemical Co., Ltd.

*5: Boiling water resistance

A test panel was dipped into a boiling water at 100° C. for 10 hours, followed by evaluating film appearance by the naked eye as follows.

5: No changes in appearance is observed compared with a film prior to testing.

4: A very little change in appearance is observed compared with a film prior to testing.

3: A little change in appearance is observed compared with a film prior to testing.

2: Changes in appearance are observed compared with a film prior to testing.

1: Remarkable changes in appearance are observed compared with a film prior to testing.

Change in appearance was evaluated by examining stained condition, color change, blistering, cracking, flashing, peeling, softening, etc.

*6: Water resistance

A test panel was dipped into a hot water at 40° C. for 24 hours, followed by evaluating film appearance by the naked eye as follows.

5: No changes in appearance is observed compared with a film prior to testing.

4: A very little change in appearance is observed compared with a film prior to testing.

3: A little change in appearance is observed compared with a film prior to testing.

2: Changes in appearance are observed compared with a film prior to testing.

1: Remarkable changes in appearance are observed compared with a film prior to testing.

Change in appearance was evaluated by examining stained condition, color change, blistering, cracking, flashing, peeling, softening, etc.

*7: Alkali resistance A-1

A test panel was dipped into a 10% aqueous caustic soda solution at 20° C. for 10 days, followed by examining film appearance by the naked eye. Evaluation was carried out in the same manner as in *5.

*8: Alkali resistance A-2

A test panel was dipped into a 1% aqueous caustic soda solution at 20° C. for 3 days, followed by examining film appearance by the naked eye. Evaluation was carried out in the same manner as in *6.

*9: Alkali resistance B-1

A test panel was dipped into a 3% aqueous sodium carbonate solution at 20° C. for 3 days, followed by examining film appearance by the naked eye. Evaluation was carried out in the same manner as in *5.

*10: Alkali resistance B-2

A test panel was dipped into a 3% aqueous sodium carbonate solution at 20° C. for 3 days, followed by examining film appearance by the naked eye. Evaluation was carried out in the same manner as in *6.

*11: Outdoor exposure test A

A test panel was installed at an angle of 30 degrees on the south side in Tokyo Factory, Kansai Paint Co., Ltd. After subjecting test panels to outdoor exposure for 3 months, 6 months and 12 months respectively, the resulting test panels free of further treatment, for example, washing with water, etc. were subjected to film performance tests as follows.

Appearance (in stain): A stained condition of the film surface was evaluated in the same manner as in *5.

Contact angle to water: Measurement was carried out in the same manner as in *4 by use of the test panel free of further treatments, for example, washing with water, etc.

Lightness difference ($\Delta L^*$): Difference in lightness (value L) between before and after outdoor exposure is represented by $\Delta L^*$. Measurement of the value L was carried out by use of a differential calorimeter CR-300 (trade name, marketed by Minoruta Co., Ltd.). Lightness difference $\Delta L^*$ is such that as the value is reduced, stain on the film surface is reduced.

*12: Outdoor exposure test B

Outdoor exposure test B is the same as Outdoor exposure test A except that appearance is evaluated in the same manner as in *6.

*13: Trademark of HMDI based urethane curing agent marketed by Kansai Paint Co., Ltd.

TABLE 1

| Compounds and Comparative Compounds | $A_1$ | $B_1$ | $C_1$ | $D_1$ | $E_1$ | $F_1$ | $G_1$ | $H_1$ | $J_1$ |
|---|---|---|---|---|---|---|---|---|---|
| γ-glycidoxypropyltrimethoxysilane | 0.20 | — | — | — | — | 0.20 | 0.20 | 0.20 | 0.20 |
| γ-mercaptopropyltrimethoxysilane | — | 0.38 | — | — | — | — | — | — | — |
| γ-methacryloxypropyltrimethoxysilane | — | — | 0.50 | — | — | — | — | — | — |
| Vinyltriethoxysilane | — | — | — | 0.05 | — | — | — | — | — |
| γ-glycidoxypropylmethyldimethoxysilane | — | — | — | — | 0.30 | — | — | — | — |
| Methyltrimethoxysilane | 0.05 | 0.02 | 0.10 | — | 0.20 | 0.05 | — | — | — |
| Methyltriethoxysilane | — | — | — | 0.30 | — | — | — | — | — |
| Methyltributanoxysilane | — | — | — | — | — | — | 0.05 | — | — |
| Tetramethoxysilane | 0.75 | — | 0.40 | — | — | 0.75 | 0.75 | 0.80 | 0.80 |
| Tetraethoxysilane | — | 0.60 | — | 0.65 | 0.50 | — | — | — | — |
| KF | 0.001 | 0.001 | 0.001 | 0.01 | 0.0001 | 0.001 | — | — | — |
| HCl | — | 0.005 | — | — | — | 0.005 | 0.005 | 0.005 | 0.005 |
| $H_2O$ | 0.95 | 0.80 | 0.90 | 0.975 | 0.983 | 0.95 | 0.95 | 0.95 | 0.95 |
| Preparation Process | I | I | I | I | I | II | III | I | IV |
| Organofunctional group content (mol %) | 20 | 38 | 50 | 5 | 30 | 20 | 20 | 20 | 20 |
| Unit $T_2$ content (mol %) | 5 | 2 | 10 | 30 | 20 | 5 | 5 | 0 | 0 |
| Unit Q content (mol %) | 75 | 60 | 40 | 65 | 50 | 75 | 75 | 80 | 80 |
| Degree of polymerization | 20 | 5 | 10 | 40 | 60 | 20 | 20 | 20 | 20 |

TABLE 2

| | Examples | | | | | | | | | Comparation Examples | | | | | |
|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 |
| FUCARON White Enamel | 286 | 286 | 286 | 286 | 286 | 286 | 286 | 286 | 286 | 286 | 286 | 286 | 286 | 286 | 286 |
| Compound $A_1$ | 0.5 | 5 | 0.5 | | | | | | | | | | | | |
| Compound $B_1$ | | | | 5 | | | | | | | | | | | |
| Compound $C_1$ | | | | | 5 | | | | | | | | | | |
| Compound $D_1$ | | | | | | 5 | | | | | | | | | |
| Compound $E_1$ | | | | | | | 5 | | | | | | | | |
| Compound $F_1$ | | | | | | | | 5 | | | | | | | |
| Compound $G_1$ | | | | | | | | | 5 | | | | | | |
| Methyl silicate 51*[1] | | | | | | | | | | | | | | 5 | |
| KBM-403*[2] | | | | | | | | | | | | | | | 5 |

TABLE 2-continued

|  | Examples |  |  |  |  |  |  |  |  | Comparation Examples |  |  |  |  |  |
|---|---|---|---|---|---|---|---|---|---|---|---|---|---|---|---|
|  | 1 | 2 | 3 | 4 | 5 | 6 | 7 | 8 | 9 | 1 | 2 | 3 | 4 | 5 | 6 |
| KBM-803*[3] |  |  |  |  |  |  |  |  |  |  |  |  | 5 |  |  |
| Compound $H_1$ |  |  |  |  |  |  |  |  |  |  |  |  |  | 5 |  |
| Compound $J_1$ |  |  |  |  |  |  |  |  |  |  |  |  |  |  | 5 |
| Contact angle to water A*[4] | 59 | 35 | 18 | 36 | 49 | 41 | 44 | 24 | 28 | 75 | 28 | 78 | 75 | 34 | 28 |
| Boiling water resistance*[5] | 5 | 5 | 5 | 5 | 5 | 5 | 4 | 3 | 3 | 5 | 1 | 5 | 5 | 2 | 1 |
| Alkali resistance A-1*[7] | 5 | 5 | 4 | 5 | 5 | 4 | 5 | 3 | 3 | 5 | 1 | 5 | 5 | 1 | 1 |
| Outdoor exposure test A*[11] |  |  |  |  |  |  |  |  |  |  |  |  |  |  |  |
| 3 months |  |  |  |  |  |  |  |  |  |  |  |  |  |  |  |
| Appearance (in stain) | 4 | 5 | 5 | 5 | 4 | 4 | 4 | 5 | 5 | 2 | 5 | 2 | 1 | 5 | 4 |
| Contact angle to water | 62 | 38 | 22 | 36 | 54 | 49 | 51 | 24 | 30 | 73 | 26 | 76 | 75 | 38 | 52 |
| ΔL* | 4.3 | 1.6 | 1.0 | 1.2 | 3.1 | 3.2 | 3.8 | 1.2 | 1.4 | 6.2 | 1.8 | 8.3 | 10.5 | 1.8 | 3.8 |
| 6 months |  |  |  |  |  |  |  |  |  |  |  |  |  |  |  |
| Appearance (in stain) | 4 | 5 | 5 | 5 | 5 | 4 | 4 | 5 | 5 | 1 | 5 | 1 | 1 | 5 | 5 |
| Contact angle to water | 59 | 35 | 16 | 34 | 50 | 48 | 44 | 26 | 28 | 75 | 28 | 78 | 75 | 35 | 29 |
| ΔL* | 4.0 | 1.2 | 0.8 | 1.2 | 2.0 | 3.3 | 2.8 | 1.0 | 1.6 | 13.5 | 1.4 | 14.8 | 15.0 | 1.1 | 1.6 |
| 12 months |  |  |  |  |  |  |  |  |  |  |  |  |  |  |  |
| Appearance (in stain) | 4 | 5 | 5 | 5 | 5 | 5 | 5 | 5 | 5 | 1 | 5 | 1 | 1 | 5 | 5 |
| Contact angle to water | 57 | 35 | 18 | 34 | 47 | 43 | 43 | 20 | 26 | 72 | 28 | 80 | 78 | 33 | 28 |
| ΔL* | 3.9 | 1.3 | 1.1 | 1.0 | 2.1 | 2.1 | 2.0 | 1.0 | 1.2 | 14.8 | 1.3 | 14.5 | 16.5 | 1.1 | 1.3 |

TABLE 3

|  | Examples |  |  |  |  |  |  |  |  | Comparation Examples |  |  |  |  |  |
|---|---|---|---|---|---|---|---|---|---|---|---|---|---|---|---|
|  | 10 | 11 | 12 | 13 | 14 | 15 | 16 | 17 | 18 | 7 | 8 | 9 | 10 | 11 | 12 |
| RETAN PAQ White Enamel | 278 | 278 | 278 | 278 | 278 | 278 | 278 | 278 | 278 | 278 | 278 | 278 | 278 | 278 | 278 |
| Compound $A_1$ | 0.5 | 5 | 25 |  |  |  |  |  |  |  |  |  |  |  |  |
| Compound $B_1$ |  |  |  | 5 |  |  |  |  |  |  |  |  |  |  |  |
| Compound $C_1$ |  |  |  |  | 5 |  |  |  |  |  |  |  |  |  |  |
| Compound $D_1$ |  |  |  |  |  | 5 |  |  |  |  |  |  |  |  |  |
| Compound $E_1$ |  |  |  |  |  |  | 5 |  |  |  |  |  |  |  |  |
| Compound $F_1$ |  |  |  |  |  |  |  | 5 |  |  |  |  |  |  |  |
| Compound $G_1$ |  |  |  |  |  |  |  |  | 5 |  |  |  |  |  |  |
| Methyl silicate 51*[1] |  |  |  |  |  |  |  |  |  | 5 |  |  |  |  |  |
| KBM-403*[2] |  |  |  |  |  |  |  |  |  |  | 5 |  |  |  |  |
| KBM-803*[3] |  |  |  |  |  |  |  |  |  |  |  | 5 |  |  |  |
| Compound $H_1$ |  |  |  |  |  |  |  |  |  |  |  |  |  | 5 |  |
| Compound $J_1$ |  |  |  |  |  |  |  |  |  |  |  |  |  |  | 5 |
| RETAN PAQ curing agent*[13] | 10 | 10 | 10 | 10 | 10 | 10 | 10 | 10 | 10 | 10 | 10 | 10 | 10 | 10 | 10 |
| Contact angle to water A*[4] | 64 | 42 | 25 | 40 | 38 | 42 | 38 | 21 | 32 | 81 | 9 | 80 | 81 | 32 | 21 |
| Boiling water resistance*[5] | 5 | 5 | 5 | 5 | 5 | 5 | 5 | 4 | 4 | 5 | 1 | 5 | 5 | 1 | 1 |
| Alkali resistance A-1*[7] | 5 | 5 | 4 | 5 | 5 | 5 | 5 | 4 | 4 | 5 | 1 | 5 | 5 | 1 | 1 |
| Outdoor exposure test A*[11] |  |  |  |  |  |  |  |  |  |  |  |  |  |  |  |
| 3 months |  |  |  |  |  |  |  |  |  |  |  |  |  |  |  |
| Appearance (in stain) | 4 | 5 | 5 | 5 | 5 | 5 | 4 | 5 | 5 | 1 | 5 | 1 | 1 | 4 | 5 |
| Contact angle to water | 61 | 42 | 26 | 42 | 43 | 42 | 48 | 26 | 33 | 81 | 12 | 82 | 79 | 51 | 31 |
| ΔL* | 5.1 | 1.8 | 1.0 | 1.7 | 1.6 | 1.5 | 3.2 | 1.3 | 1.7 | 8.9 | 0.8 | 14.4 | 13.3 | 4.2 | 1.4 |
| 6 months |  |  |  |  |  |  |  |  |  |  |  |  |  |  |  |
| Appearance (in stain) | 4 | 5 | 5 | 5 | 5 | 5 | 5 | 5 | 5 | 1 | 5 | 1 | 1 | 5 | 5 |
| Contact angle to water | 62 | 41 | 27 | 40 | 39 | 43 | 39 | 22 | 33 | 78 | 9 | 81 | 80 | 36 | 21 |
| ΔL* | 4.4 | 1.8 | 0.9 | 1.7 | 1.5 | 1.5 | 1.2 | 1.1 | 1.7 | 13.3 | 1.1 | 13.8 | 16.3 | 1.9 | 1.0 |
| 12 months |  |  |  |  |  |  |  |  |  |  |  |  |  |  |  |
| Appearance (in stain) | 4 | 5 | 5 | 5 | 5 | 5 | 5 | 5 | 5 | 1 | 5 | 1 | 1 | 5 | 5 |
| Contact angle to water | 61 | 40 | 24 | 41 | 40 | 42 | 38 | 24 | 33 | 80 | 9 | 80 | 82 | 33 | 21 |
| ΔL* | 4.3 | 1.0 | 1.0 | 1.6 | 1.3 | 1.4 | 1.0 | 1.2 | 1.7 | 15.3 | 1.2 | 14.3 | 17.4 | 1.7 | 1.1 |

TABLE 4

|  | Examples |  |  |  |  |  |  |  |  | Comparation Examples |  |  |  |  |  |
|---|---|---|---|---|---|---|---|---|---|---|---|---|---|---|---|
|  | 19 | 20 | 21 | 22 | 23 | 24 | 25 | 26 | 27 | 13 | 14 | 15 | 16 | 17 | 18 |
| NEO FTALIT White Enamel | 312 | 312 | 312 | 312 | 312 | 312 | 312 | 312 | 312 | 312 | 312 | 312 | 312 | 312 | 312 |
| Compound $A_1$ | 0.5 | 5 | 25 | | | | | | | | | | | | |
| Compound $B_1$ | | | | 5 | | | | | | | | | | | |
| Compound $C_1$ | | | | | 5 | | | | | | | | | | |
| Compound $D_1$ | | | | | | 5 | | | | | | | | | |
| Compound $E_1$ | | | | | | | 5 | | | | | | | | |
| Compound $F_1$ | | | | | | | | 5 | | | | | | | |
| Compound $G_1$ | | | | | | | | | 5 | | | | | | |
| Methyl silicate 51*[1] | | | | | | | | | | | | 5 | | | |
| KBM-403*[2] | | | | | | | | | | | | | 5 | | |
| KBM-803*[3] | | | | | | | | | | | | | | 5 | |
| Compound $H_1$ | | | | | | | | | | | | | | | 5 |
| Compound $J_1$ | | | | | | | | | | | | | | | 5 |
| Contact angle to water A*[4] | 64 | 31 | 22 | 30 | 26 | 32 | 36 | 28 | 25 | 72 | 8 | 71 | 70 | 18 | 24 |
| Alkali resistance B-1*[9] | 5 | 5 | 4 | 5 | 5 | 5 | 4 | 3 | 3 | 5 | 1 | 5 | 5 | 1 | 1 |
| Outdoor exposure test A*[11] | | | | | | | | | | | | | | | |
| 3 months | | | | | | | | | | | | | | | |
| Appearance (in stain) | 4 | 5 | 5 | 5 | 5 | 5 | 5 | 5 | 5 | 1 | 5 | 1 | 1 | 5 | 5 |
| Contact angle to water | 69 | 38 | 25 | 31 | 25 | 38 | 38 | 29 | 25 | 73 | 12 | 71 | 71 | 19 | 30 |
| ΔL* | 4.4 | 1.1 | 1.1 | 1.3 | 1.3 | 1.8 | 1.7 | 1.3 | 1.1 | 10.5 | 0.8 | 11.3 | 11.0 | 1.3 | 1.2 |
| 6 months | | | | | | | | | | | | | | | |
| Appearance (in stain) | 4 | 5 | 5 | 5 | 5 | 5 | 5 | 5 | 5 | 1 | 5 | 1 | 1 | 5 | 5 |
| Contact angle to water | 66 | 30 | 22 | 31 | 26 | 37 | 36 | 28 | 24 | 74 | 9 | 71 | 71 | 18 | 25 |
| ΔL* | 4.1 | 0.8 | 1.1 | 1.2 | 0.9 | 1.7 | 1.5 | 1.2 | 0.9 | 11.5 | 0.6 | 13.6 | 15.5 | 0.8 | 1.1 |
| 12 months | | | | | | | | | | | | | | | |
| Appearance (in stain) | 4 | 5 | 5 | 5 | 5 | 5 | 5 | 5 | 5 | 1 | 5 | 1 | 1 | 5 | 5 |
| Contact angle to water | 65 | 31 | 22 | 31 | 26 | 33 | 36 | 29 | 25 | 75 | 9 | 71 | 70 | 18 | 24 |
| ΔL* | 4.0 | 0.9 | 0.8 | 1.2 | 0.9 | 1.2 | 1.5 | 1.2 | 0.9 | 11.8 | 0.7 | 14.6 | 16.8 | 1.0 | 1.1 |

TABLE 5

| Compounds and Comparative Compounds | $A_2$ | $B_2$ | $C_2$ | $D_2$ | $E_2$ | $F_2$ | $G_2$ |
|---|---|---|---|---|---|---|---|
| γ-methacryloxypropyltrimethoxysilane (a) | 1.00 | — | — | — | — | 1.00 | — |
| γ-acryloxypropyltrimethoxysilane | — | 1.00 | — | — | — | — | — |
| Vinyltriethoxysilane | — | — | 1.00 | — | — | — | — |
| γ-chloropropyltrimethoxysilane | — | — | — | 1.00 | — | — | — |
| γ-aminopropylmethyldimethoxysilane | — | — | — | — | 1.00 | — | — |
| Prehydrolyzate of (a) | — | — | — | — | — | — | 1.00 |
| Tetramethoxysilane (b) | 1.00 | 4.00 | — | 0.50 | — | — | — |
| Tetraethoxysilane | — | — | 10.00 | — | 4.00 | — | — |
| Tetramer of (b) | — | — | — | — | — | 1.00 | 1.00 |
| KF | — | — | 0.001 | 0.01 | — | — | — |
| $NH_4F$ | 0.001 | 0.001 | — | — | — | — | — |
| HCl | — | — | 0.005 | — | — | 0.005 | 0.005 |
| $H_2O$ | 1.60 | 4.75 | 10.82 | 1.35 | 4.75 | 1.60 | 3.75 |
| Preparation Process | I | I | I | I | I | II | III |
| Organofunctional group content (mol %) | 50 | 20 | 9 | 67 | 20 | 50 | 50 |
| Unit Q content (mol %) | 50 | 60 | 91 | 33 | 80 | 50 | 50 |
| Degree of polymerization | 5 | 20 | 60 | 10 | 20 | 5 | — |

TABLE 6

|  | Examples |  |  |  |  |  |  | Comparation Examples |  |  |  |  |
|---|---|---|---|---|---|---|---|---|---|---|---|---|
|  | 28 | 29 | 30 | 31 | 32 | 33 | 34 | 19 | 20 | 21 | 22 | 23 |
| FUCARON White Enamel | 286 | 286 | 286 | 286 | 286 | 286 | 286 | 286 | 286 | 286 | 286 | 286 |
| Compound $A_2$ | 0.5 | 5 | 25 | | | | | | | | | |
| Compound $B_2$ | | | | 5 | | | | | | | | |
| Compound $C_2$ | | | | | 5 | | | | | | | |
| Compound $D_2$ | | | | | | 5 | | | | | | |
| Compound $E_2$ | | | | | | | 5 | | | | | |
| Methyl silicate 51*[1] | | | | | | | | 5 | | | | |
| KBM-403*[2] | | | | | | | | | 5 | | | |
| Compound $F_2$ | | | | | | | | | | 5 | | |

TABLE 6-continued

|  | Examples | | | | | | | Comparation Examples | | | | |
| --- | --- | --- | --- | --- | --- | --- | --- | --- | --- | --- | --- | --- |
|  | 28 | 29 | 30 | 31 | 32 | 33 | 34 | 19 | 20 | 21 | 22 | 23 |
| Compound $G_2$ |  |  |  |  |  |  |  |  |  |  |  | 5 |
| Contact angle to water A*[4] | 54 | 28 | 19 | 26 | 22 | 43 | 42 | 76 | 31 | 78 | 26 | 28 |
| Water resistance*[6] | 5 | 5 | 4 | 5 | 4 | 5 | 4 | 5 | 1 | 5 | 1 | 1 |
| Alkali resistance A-2*[8] | 5 | 5 | 4 | 5 | 5 | 5 | 5 | 5 | 1 | 5 | 1 | 1 |
| Outdoor exposure test B*[12] |  |  |  |  |  |  |  |  |  |  |  |  |
| 3 months |  |  |  |  |  |  |  |  |  |  |  |  |
| Appearance (in stain) | 4 | 5 | 5 | 5 | 5 | 4 | 5 | 1 | 5 | 1 | 4 | 5 |
| Contact angle to water | 59 | 30 | 32 | 26 | 22 | 53 | 43 | 76 | 33 | 77 | 27 | 33 |
| ΔL* | 4.1 | 1.1 | 1.4 | 0.9 | 1.0 | 3.3 | 1.7 | 11.0 | 1.3 | 10.2 | 1.4 | 1.2 |
| 6 months |  |  |  |  |  |  |  |  |  |  |  |  |
| Appearance (in stain) | 4 | 5 | 5 | 5 | 5 | 5 | 5 | 1 | 5 | 1 | 5 | 5 |
| Contact angle to water | 54 | 27 | 20 | 26 | 22 | 44 | 42 | 78 | 33 | 78 | 26 | 30 |
| ΔL* | 3.6 | 0.8 | 1.1 | 0.8 | 1.1 | 1.8 | 1.6 | 13.4 | 1.1 | 10.3 | 1.3 | 1.0 |
| 12 months |  |  |  |  |  |  |  |  |  |  |  |  |
| Appearance (in stain) | 4 | 5 | 5 | 5 | 5 | 5 | 5 | 1 | 5 | 1 | 5 | 5 |
| Contact angle to water | 54 | 28 | 20 | 26 | 22 | 43 | 42 | 76 | 33 | 78 | 26 | 30 |
| ΔL* | 3.6 | 0.9 | 1.0 | 0.8 | 0.9 | 1.7 | 1.6 | 18.5 | 1.1 | 14.5 | 1.3 | 0.9 |

TABLE 7

|  | Examples | | | | | | | Comparation Examples | | | | |
| --- | --- | --- | --- | --- | --- | --- | --- | --- | --- | --- | --- | --- |
|  | 35 | 36 | 37 | 38 | 39 | 40 | 41 | 24 | 25 | 26 | 27 | 28 |
| RETAN PAQ White Enamel | 278 | 278 | 278 | 278 | 278 | 278 | 278 | 278 | 278 | 278 | 278 | 278 |
| Compound $A_2$ | 0.5 | 5 | 25 |  |  |  |  |  |  |  |  |  |
| Compound $B_2$ |  |  |  | 5 |  |  |  |  |  |  |  |  |
| Compound $C_2$ |  |  |  |  | 5 |  |  |  |  |  |  |  |
| Compound $D_2$ |  |  |  |  |  | 5 |  |  |  |  |  |  |
| Compound $E_2$ |  |  |  |  |  |  | 5 |  |  |  |  |  |
| Methyl silicate 51*[1] |  |  |  |  |  |  |  | 5 |  |  |  |  |
| KBM-403*[2] |  |  |  |  |  |  |  |  | 5 |  |  |  |
| Compound $F_2$ |  |  |  |  |  |  |  |  |  | 5 |  |  |
| Compound $G_2$ |  |  |  |  |  |  |  |  |  |  | 5 |  |
| RETAN PAQ Curing agent*[13] | 10 | 10 | 10 | 10 | 10 | 10 | 10 | 10 | 10 | 10 | 10 | 10 |
| Contact angle to water A*[4] | 52 | 32 | 28 | 26 | 24 | 36 | 30 | 80 | 26 | 82 | 33 | 30 |
| Water resistance*[6] | 5 | 5 | 4 | 5 | 4 | 5 | 5 | 5 | 1 | 5 | 1 | 1 |
| Alkali resistance A-2*[8] | 5 | 5 | 5 | 5 | 4 | 5 | 5 | 5 | 1 | 5 | 1 | 1 |
| Outdoor exposure test B*[12] |  |  |  |  |  |  |  |  |  |  |  |  |
| 3 months |  |  |  |  |  |  |  |  |  |  |  |  |
| Appearance (in stain) | 4 | 5 | 5 | 5 | 5 | 4 | 5 | 1 | 5 | 1 | 4 | 5 |
| Contact angle to water | 52 | 36 | 29 | 27 | 31 | 51 | 36 | 82 | 27 | 84 | 51 | 30 |
| ΔL* | 3.2 | 1.3 | 0.9 | 0.9 | 1.3 | 3.2 | 1.4 | 9.5 | 1.0 | 13.4 | 3.8 | 1.3 |
| 6 months |  |  |  |  |  |  |  |  |  |  |  |  |
| Appearance (in stain) | 4 | 5 | 5 | 5 | 5 | 5 | 5 | 1 | 5 | 1 | 5 | 5 |
| Contact angle to water | 52 | 32 | 29 | 27 | 23 | 38 | 31 | 80 | 26 | 80 | 33 | 31 |
| ΔL* | 3.2 | 1.0 | 0.9 | 0.8 | 1.0 | 1.8 | 1.3 | 13.4 | 1.0 | 15.8 | 1.9 | 1.3 |
| 12 months |  |  |  |  |  |  |  |  |  |  |  |  |
| Appearance (in stain) | 4 | 5 | 5 | 5 | 5 | 5 | 5 | 1 | 5 | 1 | 5 | 5 |
| Contact angle to water | 53 | 32 | 29 | 27 | 24 | 39 | 31 | 81 | 26 | 81 | 33 | 30 |
| ΔL* | 3.2 | 1.0 | 1.1 | 0.8 | 1.0 | 1.7 | 1.3 | 15.8 | 1.1 | 17.0 | 1.7 | 1.2 |

TABLE 8

|  | Examples | | | | | | | Comparation Examples | | | | |
| --- | --- | --- | --- | --- | --- | --- | --- | --- | --- | --- | --- | --- |
|  | 42 | 43 | 44 | 45 | 46 | 47 | 48 | 29 | 30 | 31 | 32 | 33 |
| NEO FTALIT White Enamel | 312 | 312 | 312 | 312 | 312 | 312 | 312 | 312 | 312 | 312 | 312 | 312 |
| Compound $A_2$ | 0.5 | 5 | 25 |  |  |  |  |  |  |  |  |  |
| Compound $B_2$ |  |  |  | 5 |  |  |  |  |  |  |  |  |
| Compound $C_2$ |  |  |  |  | 5 |  |  |  |  |  |  |  |

TABLE 8-continued

|  | Examples | | | | | | | Comparation Examples | | | | |
| --- | --- | --- | --- | --- | --- | --- | --- | --- | --- | --- | --- | --- |
|  | 42 | 43 | 44 | 45 | 46 | 47 | 48 | 29 | 30 | 31 | 32 | 33 |
| Compound $D_2$ |  |  |  |  |  | 5 |  |  |  |  |  |  |
| Compound $E_2$ |  |  |  |  |  |  | 5 |  |  |  |  |  |
| Methyl silicate 51*[1] |  |  |  |  |  |  |  |  | 5 |  |  |  |
| KBM-403*[2] |  |  |  |  |  |  |  |  |  | 5 |  |  |
| Compound $F_2$ |  |  |  |  |  |  |  |  |  |  | 5 |  |
| Compound $G_2$ |  |  |  |  |  |  |  |  |  |  |  | 5 |
| Contact angle to water A*[4] | 50 | 28 | 12 | 22 | 21 | 36 | 30 | 73 | 24 | 76 | 28 | 24 |
| Alkali resistance B-2*[10] | 5 | 5 | 4 | 5 | 4 | 5 | 5 | 5 | 1 | 5 | 1 | 1 |
| Outdoor exposure test B*[12] |  |  |  |  |  |  |  |  |  |  |  |  |
| 3 months |  |  |  |  |  |  |  |  |  |  |  |  |
| Appearance (in stain) | 4 | 5 | 5 | 5 | 5 | 4 | 5 | 1 | 5 | 1 | 5 | 5 |
| Contact angle to water | 58 | 28 | 16 | 23 | 28 | 49 | 38 | 75 | 25 | 76 | 29 | 24 |
| ΔL* | 4.0 | 0.9 | 0.9 | 0.9 | 1.3 | 3.0 | 1.8 | 10.5 | 1.0 | 12.5 | 1.1 | 1.3 |
| 6 months |  |  |  |  |  |  |  |  |  |  |  |  |
| Appearance (in stain) | 4 | 5 | 5 | 5 | 5 | 5 | 5 | 1 | 5 | 1 | 5 | 5 |
| Contact angle to water | 51 | 29 | 12 | 23 | 21 | 36 | 31 | 73 | 25 | 77 | 29 | 24 |
| ΔL* | 3.2 | 1.0 | 0.9 | 0.9 | 1.0 | 1.9 | 1.3 | 15.5 | 1.1 | 13.0 | 1.1 | 1.3 |
| 12 months |  |  |  |  |  |  |  |  |  |  |  |  |
| Appearance (in stain) | 4 | 5 | 5 | 5 | 5 | 5 | 5 | 1 | 5 | 1 | 5 | 5 |
| Contact angle to water | 51 | 28 | 12 | 23 | 21 | 36 | 30 | 75 | 25 | 78 | 28 | 24 |
| ΔL* | 3.1 | 0.8 | 0.9 | 0.8 | 1.0 | 1.3 | 1.3 | 17.5 | 1.0 | 15.0 | 1.0 | 1.3 |

TABLE 9

| Compounds and Comparative Compounds | $A_3$ | $B_3$ | $C_3$ | $D_3$ | $E_3$ | $F_3$ |
| --- | --- | --- | --- | --- | --- | --- |
| γ-glycidoxypropyltrimethoxysilane (a) | 1.00 | — | — | 1.00 | 1.00 | — |
| β-(3,4-epoxycyclohexyl)ethyltrimethoxysilane | — | 1.00 | — | — | — | — |
| γ-glycidoxypropylmethyldiethoxysilane | — | — | 1.00 | — | — | — |
| Prehydrolyzate of (a) | — | — | — | — | — | 1.00 |
| Tetramethoxysilane (b) | 1.00 | 4.00 | 10.00 | — | — | — |
| Tetraethoxysilane | — | — | — | 0.50 | — | — |
| Tetramer of (b) | — | — | — | — | 1.00 | 1.00 |
| KF | 0.001 | 0.001 | 0.001 | 0.01 | — | — |
| HCl | — | 0.005 | — | — | 0.005 | 0.005 |
| $H_2O$ | 1.60 | 4.75 | 10.32 | 1.35 | 1.60 | 3.75 |
| Preparation process | I | I | I | I | II | III |
| Epoxy group content (mol %) | 50 | 20 | 9 | 67 | 50 | 50 |
| Unit Q content (mol %) | 50 | 80 | 91 | 33 | 50 | 50 |
| Degree of polymerization | 5 | 20 | 60 | 10 | 5 | — |

TABLE 10

|  | Examples | | | | | | Comparation Examples | | | | |
| --- | --- | --- | --- | --- | --- | --- | --- | --- | --- | --- | --- |
|  | 49 | 50 | 51 | 52 | 53 | 54 | 34 | 35 | 36 | 37 | 38 |
| FUCARON White Enamel | 286 | 286 | 286 | 286 | 286 | 286 | 286 | 286 | 286 | 286 | 286 |
| Compound $A_3$ | 0.5 | 5 | 25 |  |  |  |  |  |  |  |  |
| Compound $B_3$ |  |  |  | 5 |  |  |  |  |  |  |  |
| Compound $C_3$ |  |  |  |  | 5 |  |  |  |  |  |  |
| Compound $D_3$ |  |  |  |  |  | 5 |  |  |  |  |  |
| Compound $E_3$ |  |  |  |  |  |  |  | 5 |  |  |  |
| Compound $F_3$ |  |  |  |  |  |  |  |  | 5 |  |  |
| Methyl silicate 51*[1] |  |  |  |  |  |  |  |  |  | 5 |  |
| KBM-403*[2] |  |  |  |  |  |  |  |  |  |  | 5 |
| Contact angle to water A*[4] | 53 | 32 | 22 | 34 | 20 | 34 | 75 | 41 | 46 | 36 | 78 |
| Water resistance*[6] | 5 | 5 | 4 | 5 | 4 | 5 | 5 | 2 | 2 | 2 | 5 |
| Alkali resistance A-2*[8] | 5 | 5 | 4 | 5 | 4 | 5 | 5 | 1 | 1 | 1 | 5 |
| Outdoor exposure test B*[12] |  |  |  |  |  |  |  |  |  |  |  |
| 3 months |  |  |  |  |  |  |  |  |  |  |  |
| Appearance (in stain) | 4 | 5 | 5 | 5 | 5 | 5 | 2 | 4 | 4 | 5 | 1 |
| Contact angle to water | 58 | 38 | 28 | 38 | 20 | 36 | 73 | 48 | 51 | 36 | 75 |
| ΔL* | 3.9 | 1.8 | 1.0 | 1.9 | 0.8 | 2.1 | 6.2 | 2.6 | 3.6 | 1.6 | 9.8 |

TABLE 10-continued

|  | Examples | | | | | | Comparation Examples | | | | |
| --- | --- | --- | --- | --- | --- | --- | --- | --- | --- | --- | --- |
|  | 49 | 50 | 51 | 52 | 53 | 54 | 34 | 35 | 36 | 37 | 38 |
| 6 months |  |  |  |  |  |  |  |  |  |  |  |
| Appearance (in stain) | 4 | 5 | 5 | 5 | 5 | 5 | 1 | 5 | 4 | 5 | 1 |
| Contact angle to water | 53 | 38 | 25 | 35 | 18 | 38 | 75 | 40 | 51 | 34 | 76 |
| ΔL* | 3.8 | 1.9 | 0.9 | 1.6 | 0.7 | 1.6 | 13.5 | 1.3 | 3.2 | 1.1 | 12.2 |
| 12 months |  |  |  |  |  |  |  |  |  |  |  |
| Appearance (in stain) | 4 | 5 | 5 | 5 | 5 | 5 | 1 | 5 | 5 | 5 | 1 |
| Contact angle to water | 53 | 33 | 25 | 32 | 21 | 36 | 72 | 43 | 46 | 34 | 75 |
| ΔL* | 3.6 | 1.2 | 0.8 | 1.6 | 1.0 | 1.8 | 14.8 | 1.4 | 1.8 | 1.1 | 12.8 |

TABLE 11

|  | Examples | | | | | | Comparation Examples | | | | |
| --- | --- | --- | --- | --- | --- | --- | --- | --- | --- | --- | --- |
|  | 55 | 56 | 57 | 58 | 59 | 60 | 39 | 40 | 41 | 42 | 43 |
| RETAN PAQ White Enamel | 278 | 278 | 278 | 278 | 278 | 278 | 278 | 278 | 278 | 278 | 278 |
| Compound $A_3$ | 0.5 | 5 | 25 |  |  |  |  |  |  |  |  |
| Compound $B_3$ |  |  |  | 5 |  |  |  |  |  |  |  |
| Compound $C_3$ |  |  |  |  | 5 |  |  |  |  |  |  |
| Compound $D_3$ |  |  |  |  |  | 5 |  |  |  |  |  |
| Compound $E_3$ |  |  |  |  |  |  |  | 5 |  |  |  |
| Compound $F_3$ |  |  |  |  |  |  |  |  | 5 |  |  |
| Methyl silicate 51*[1] |  |  |  |  |  |  |  |  |  | 5 |  |
| KBM-403*[2] |  |  |  |  |  |  |  |  |  |  | 5 |
| RETAN PAQ Curing agent[#13] | 10 | 10 | 10 | 10 | 10 | 10 | 10 | 10 | 10 | 10 | 10 |
| Contact angle to water A*[4] | 59 | 42 | 30 | 38 | 40 | 44 | 82 | 51 | 48 | 38 | 83 |
| Water resistance*[6] | 5 | 5 | 4 | 5 | 5 | 5 | 5 | 2 | 2 | 2 | 5 |
| Alkali resistance A-2*[8] | 5 | 5 | 4 | 5 | 5 | 5 | 5 | 1 | 1 | 1 | 5 |
| Outdoor exposure test B*[12] |  |  |  |  |  |  |  |  |  |  |  |
| 3 months |  |  |  |  |  |  |  |  |  |  |  |
| Appearance (in stain) | 4 | 5 | 5 | 5 | 5 | 4 | 2 | 4 | 4 | 5 | 1 |
| Contact angle to water | 60 | 42 | 38 | 38 | 39 | 53 | 74 | 60 | 59 | 42 | 80 |
| ΔA* | 3.6 | 1.6 | 1.6 | 1.1 | 1.2 | 3.2 | 6.9 | 3.8 | 3.4 | 1.8 | 11.0 |
| 6 months |  |  |  |  |  |  |  |  |  |  |  |
| Appearance (in stain) | 4 | 5 | 5 | 5 | 5 | 5 | 1 | 4 | 5 | 5 | 1 |
| Contact angle to water | 59 | 40 | 31 | 39 | 41 | 42 | 81 | 59 | 49 | 42 | 82 |
| ΔL* | 3.4 | 1.5 | 1.1 | 1.3 | 1.4 | 1.6 | 13.0 | 3.6 | 1.8 | 1.1 | 10.9 |
| 12 months |  |  |  |  |  |  |  |  |  |  |  |
| Appearance (in stain) | 4 | 5 | 5 | 5 | 5 | 5 | 1 | 5 | 5 | 5 | 1 |
| Contact angle to water | 56 | 42 | 32 | 38 | 40 | 43 | 80 | 50 | 49 | 40 | 83 |
| ΔL* | 3.4 | 1.6 | 1.0 | 1.0 | 1.0 | 1.4 | 12.5 | 1.9 | 1.9 | 1.3 | 12.8 |

TABLE 12

|  | Examples | | | | | | Comparation Examples | | | | |
| --- | --- | --- | --- | --- | --- | --- | --- | --- | --- | --- | --- |
|  | 61 | 62 | 63 | 64 | 65 | 66 | 44 | 45 | 46 | 47 | 48 |
| NEO FTALIT White Enamel | 312 | 312 | 312 | 312 | 312 | 312 | 312 | 312 | 312 | 312 | 312 |
| Compound $A_3$ | 0.5 | 5 | 25 |  |  |  |  |  |  |  |  |
| Compound $B_3$ |  |  |  | 5 |  |  |  |  |  |  |  |
| Compound $C_3$ |  |  |  |  | 5 |  |  |  |  |  |  |
| Compound $D_3$ |  |  |  |  |  | 5 |  |  |  |  |  |
| Compound $E_3$ |  |  |  |  |  |  |  | 5 |  |  |  |
| Compound $F_3$ |  |  |  |  |  |  |  |  | 5 |  |  |
| Methyl silicate 51*[1] |  |  |  |  |  |  |  |  |  | 5 |  |
| KBM-403*[2] |  |  |  |  |  |  |  |  |  |  | 5 |
| Contact angle to water A*[4] | 56 | 32 | 26 | 30 | 34 | 38 | 71 | 22 | 20 | 34 | 72 |
| Alkali resistance B-2*[10] | 5 | 5 | 5 | 5 | 5 | 5 | 5 | 1 | 1 | 2 | 5 |
| Outdoor exposure test B*[12] |  |  |  |  |  |  |  |  |  |  |  |
| 3 months |  |  |  |  |  |  |  |  |  |  |  |
| Appearance (in stain) | 4 | 5 | 5 | 5 | 5 | 4 | 1 | 5 | 5 | 5 | 1 |

TABLE 12-continued

|  | Examples | | | | | | Comparation Examples | | | | |
| --- | --- | --- | --- | --- | --- | --- | --- | --- | --- | --- | --- |
|  | 61 | 62 | 63 | 64 | 65 | 66 | 44 | 45 | 46 | 47 | 48 |
| Contact angle to water | 56 | 30 | 24 | 34 | 38 | 51 | 74 | 28 | 31 | 33 | 77 |
| $\Delta L^*$ | 3.4 | 0.8 | 0.9 | 1.1 | 1.7 | 3.3 | 8.9 | 1.3 | 1.8 | 1.9 | 12.1 |
| 6 months | | | | | | | | | | | |
| Appearance (in stain) | 4 | 5 | 5 | 5 | 5 | 5 | 1 | 5 | 5 | 5 | 1 |
| Contact angle to water | 59 | 30 | 28 | 31 | 34 | 44 | 71 | 22 | 22 | 36 | 78 |
| $\Delta L^*$ | 3.6 | 0.7 | 0.8 | 0.8 | 1.1 | 1.3 | 10.8 | 1.1 | 1.0 | 1.8 | 11.8 |
| 12 months | | | | | | | | | | | |
| Appearance (in stain) | 4 | 5 | 5 | 5 | 5 | 5 | 1 | 5 | 5 | 5 | 1 |
| Contact angle to water | 55 | 31 | 26 | 30 | 35 | 38 | 72 | 24 | 22 | 35 | 75 |
| $\Delta L^*$ | 3.4 | 0.7 | 1.0 | 0.8 | 1.2 | 1.4 | 13.4 | 1.0 | 1.3 | 1.9 | 10.5 |

TABLE 13

| Compounds and Comparative Compounds | $A_4$ | $B_4$ | $C_4$ | $D_4$ | $E_4$ | $F_4$ |
| --- | --- | --- | --- | --- | --- | --- |
| γ-mercaptopropyltrimethoxysilane (a) | 1.00 | — | — | 1.00 | 1.00 | — |
| β-(mercaptomethylphenyl)ethyltrimethoxysilane | — | 1.00 | — | — | — | — |
| γ-mercaptopropylmethyldiethoxysilane | — | — | 1.00 | — | — | — |
| Prehydrolyzate of (a) | — | — | — | — | — | 1.00 |
| Tetramethoxysilane (b) | 1.00 | 4.00 | 10.00 | — | — | — |
| Tetraethoxysilane | — | — | — | 0.50 | — | — |
| Tetramer of (b) | — | — | — | — | 1.00 | 1.00 |
| KF | 0.001 | 0.001 | 0.001 | 0.01 | — | — |
| HCl | — | 0.005 | — | — | 0.005 | 0.005 |
| $H_2O$ | 1.60 | 4.75 | 10.82 | 1.35 | 1.60 | 3.75 |
| Preparation process | I | I | I | I | II | III |
| Mercapto group content (mol %) | 50 | 20 | 9 | 67 | 50 | 50 |
| Unit Q content (mol %) | 50 | 80 | 91 | 33 | 50 | 50 |
| Degree of polymerization | 5 | 20 | 60 | 10 | 5 | — |

TABLE 14

|  | Examples | | | | | | Comparation Examples | | | | |
| --- | --- | --- | --- | --- | --- | --- | --- | --- | --- | --- | --- |
|  | 67 | 68 | 69 | 70 | 71 | 72 | 49 | 50 | 51 | 52 | 53 |
| FUCARON White Enamel | 286 | 286 | 286 | 286 | 286 | 286 | 286 | 286 | 286 | 286 | 286 |
| Compound $A_4$ | 0.5 | 5 | 25 | | | | | | | | |
| Compound $B_4$ | | | | 5 | | | | | | | |
| Compound $C_4$ | | | | | 5 | | | | | | |
| Compound $D_4$ | | | | | | 5 | | | | | |
| Compound $E_4$ | | | | | | | | 5 | | | |
| Compound $F_4$ | | | | | | | | | 5 | | |
| Methyl silicate 51*[1] | | | | | | | | | | 5 | |
| KBM-803*[2] | | | | | | | | | | | 5 |
| Contact angle to water A*[4] | 59 | 28 | 22 | 31 | 25 | 41 | 75 | 32 | 26 | 35 | 77 |
| Water resistance*[6] | 5 | 5 | 4 | 5 | 4 | 5 | 5 | 1 | 1 | 1 | 5 |
| Alkali resistance A-2*[8] | 5 | 5 | 5 | 5 | 4 | 5 | 5 | 1 | 1 | 1 | 5 |
| Outdoor exposure test B*[12] | | | | | | | | | | | |
| 3 months | | | | | | | | | | | |
| Appearance (in stain) | 4 | 5 | 5 | 5 | 5 | 4 | 1 | 4 | 4 | 5 | 1 |
| Contact angle to water | 61 | 32 | 23 | 33 | 24 | 52 | 74 | 55 | 60 | 36 | 78 |
| $\Delta L^*$ | 4.8 | 1.1 | 1.1 | 1.3 | 7.9 | 3.9 | 11.3 | 4.6 | 4.9 | 1.1 | 14.3 |
| 6 months | | | | | | | | | | | |
| Appearance (in stain) | 4 | 5 | 5 | 5 | 5 | 5 | 1 | 5 | 5 | 5 | 1 |
| Contact angle to water | 59 | 32 | 23 | 31 | 24 | 43 | 75 | 31 | 30 | 36 | 77 |
| $\Delta L^*$ | 4.2 | 1.0 | 1.0 | 1.0 | 0.9 | 1.7 | 13.4 | 1.3 | 1.1 | 1.0 | 16.3 |
| 12 months | | | | | | | | | | | |
| Appearance (in stain) | 4 | 5 | 5 | 5 | 5 | 5 | 1 | 5 | 5 | 5 | 1 |
| Contact angle to water | 59 | 29 | 23 | 33 | 25 | 41 | 75 | 32 | 26 | 35 | 77 |
| $\Delta L^*$ | 4.1 | 1.0 | 1.0 | 1.0 | 1.0 | 1.6 | 15.8 | 1.3 | 1.0 | 1.1 | 17.7 |

TABLE 15

|  | Examples | | | | | | Comparation Examples | | | | |
| --- | --- | --- | --- | --- | --- | --- | --- | --- | --- | --- | --- |
|  | 73 | 74 | 75 | 76 | 77 | 78 | 54 | 55 | 56 | 57 | 58 |
| RETAN PAQ White Enamel | 278 | 278 | 278 | 278 | 278 | 278 | 278 | 278 | 278 | 278 | 278 |
| Compound $A_4$ | 0.5 | 5 | 25 | | | | | | | | |
| Compound $B_4$ | | | | 5 | | | | | | | |
| Compound $C_4$ | | | | | 5 | | | | | | |
| Compound $D_4$ | | | | | | 5 | | | | | |
| Compound $E_4$ | | | | | | | | 5 | | | |
| Compound $F_4$ | | | | | | | | | 5 | | |
| Methyl silicate 51*[1] | | | | | | | | | | 5 | |
| KBM-803*[2] | | | | | | | | | | | 5 |
| RETAN PAQ Curing agent*[13] | 10 | 10 | 10 | 10 | 10 | 10 | 10 | 10 | 10 | 10 | 10 |
| Contact angle to water A*[4] | 52 | 38 | 27 | 31 | 24 | 36 | 80 | 33 | 30 | 31 | 82 |
| Water resistance*[6] | 5 | 5 | 4 | 5 | 4 | 5 | 5 | 1 | 1 | 1 | 5 |
| Alkali resistance A-2*[8] | 5 | 5 | 4 | 5 | 5 | 5 | 5 | 1 | 1 | 1 | 5 |
| Outdoor exposure test B*[12] | | | | | | | | | | | |
| 3 months | | | | | | | | | | | |
| Appearance (in stain) | 4 | 5 | 5 | 5 | 5 | 5 | 1 | 5 | 4 | 5 | 1 |
| Contact angle to water | 58 | 39 | 26 | 32 | 24 | 39 | 80 | 36 | 48 | 33 | 82 |
| ΔL* | 4.2 | 1.1 | 1.4 | 1.3 | 1.1 | 1.8 | 10.5 | 1.6 | 3.6 | 1.1 | 12.4 |
| 6 months | | | | | | | | | | | |
| Appearance (in stain) | 4 | 5 | 5 | 5 | 5 | 5 | 1 | 5 | 5 | 5 | 1 |
| Contact angle to water | 54 | 39 | 27 | 31 | 24 | 39 | 79 | 33 | 32 | 31 | 80 |
| ΔL* | 4.2 | 1.0 | 1.4 | 1.2 | 1.1 | 1.6 | 14.3 | 1.1 | 1.2 | 1.3 | 15.5 |
| 12 months | | | | | | | | | | | |
| Appearance (in stain) | 4 | 5 | 5 | 5 | 5 | 5 | 1 | 5 | 5 | 5 | 1 |
| Contact angle to water | 52 | 38 | 27 | 31 | 24 | 39 | 82 | 32 | 32 | 31 | 78 |
| ΔL* | 3.8 | 0.9 | 1.1 | 1.3 | 1.0 | 1.8 | 15.6 | 1.0 | 1.1 | 1.0 | 17.0 |

TABLE 16

|  | Examples | | | | | | Comparation Examples | | | | |
| --- | --- | --- | --- | --- | --- | --- | --- | --- | --- | --- | --- |
|  | 79 | 80 | 81 | 82 | 83 | 84 | 59 | 60 | 61 | 62 | 63 |
| NEO FTALIT White Enamel | 312 | 312 | 312 | 312 | 312 | 312 | 312 | 312 | 312 | 312 | 312 |
| Compound $A_4$ | 0.5 | 5 | 25 | | | | | | | | |
| Compound $B_4$ | | | | 5 | | | | | | | |
| Compound $C_4$ | | | | | 5 | | | | | | |
| Compound $D_4$ | | | | | | 5 | | | | | |
| Compound $E_4$ | | | | | | | | 5 | | | |
| Compound $F_4$ | | | | | | | | | 5 | | |
| Methyl silicate 51*[1] | | | | | | | | | | 5 | |
| KBM-803*[2] | | | | | | | | | | | 5 |
| Contact angle to water A*[4] | 50 | 25 | 20 | 23 | 21 | 32 | 71 | 31 | 28 | 24 | 74 |
| Alkali resistance B-2*[10] | 5 | 5 | 5 | 5 | 4 | 5 | 5 | 1 | 1 | 1 | 5 |
| Outdoor exposure test B*[12] | | | | | | | | | | | |
| 3 months | | | | | | | | | | | |
| Appearance (in stain) | 4 | 5 | 5 | 5 | 5 | 5 | 1 | 4 | 4 | 5 | 1 |
| Contact angle to water | 55 | 27 | 21 | 23 | 22 | 38 | 78 | 52 | 48 | 25 | 76 |
| ΔL* | 3.7 | 1.1 | 1.3 | 0.9 | 1.2 | 1.9 | 10.8 | 3.6 | 3.3 | 1.1 | 10.8 |
| 6 months | | | | | | | | | | | |
| Appearance (in stain) | 4 | 5 | 5 | 5 | 5 | 5 | 1 | 5 | 5 | 5 | 1 |
| Contact angle to water | 51 | 25 | 20 | 23 | 21 | 33 | 71 | 32 | 28 | 25 | 74 |
| ΔL* | 3.7 | 0.9 | 1.0 | 0.9 | 1.2 | 1.4 | 14.5 | 1.3 | 1.1 | 1.1 | 13.0 |
| 12 months | | | | | | | | | | | |
| Appearance (in stain) | 4 | 5 | 5 | 5 | 5 | 5 | 1 | 5 | 5 | 5 | 1 |
| Contact angle to water | 51 | 25 | 20 | 23 | 21 | 34 | 71 | 32 | 28 | 25 | 74 |
| ΔL* | 3.6 | 0.9 | 1.0 | 0.8 | 1.0 | 1.4 | 17.0 | 1.2 | 1.0 | 1.0 | 13.8 |

What is claimed is:

1. A coating composition prepared by mixing an organic solvent based coating composition with a silicone polymer having an organofunctional group and hydrolyzable group in one molecule with an average degree of polymerization of 3 to 100, and containing (1) a unit D, as a silicone structural unit, represented by the general formula: $R^1R^2SiZ_2$, wherein $R^1$ represents an organofunctional group containing at least one functional group selected from the group consisting of epoxy group, mercapto group, (meth)acryloyl group, vinyl group, haloalkyl group and amino group; $R^2$ represents an alkyl group having 1 to 3 carbon atoms; and Z represents a hydrolyzable group or a residual group bonded to other silicon atom through a siloxane bond, said residual group being selected from the group consisting of ones represented by the following formulas:

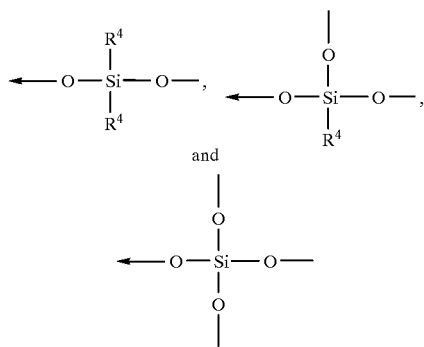

where $R^4$ represents alkyl group having 1 to 3 carbon atoms or hydroxyl group, and ←O represents oxygen to be bonded to Si in the formulas of the above silicon structural units, provided at least one Z being the residual group, and/or a unit $T^1$ as a silicon structural unit, represented by the general formula: $R^1SiZ_3$, wherein $R^1$ and Z are defined as above, in an amount of 5 to 80 mol % on the basis of a total amount of the silicon atom contained in the silicon structural unit;

(2) a unit $T^2$ as a trifunctional silicon structural unit represented by the general formula: $R^3SiZ_3$, wherein $R^3$ represents alkyl group having 1 to 3 carbon atoms and Z is defined as above, $T^2$ being present in an amount of 0.1 to 30 mol % on the basis of a total amount of the silicon atom contained in the silicone polymer; and (3) a unit Q as a tetrafunctional silicon structural unit represented by the general formula: $SiZ_4$, wherein Z is defined as above, in an amount of 10 to 94.9 mol % on the basis of a total amount of the silicon atom contained in the silicone polymer, provided that a total amount of the units $T^2$ and Q is in the range of 20 to 95 mol %, on the basis of a total amount of silicon atom contained in the silicone polymer respectively, said silicone polymer being obtained by subjecting a mixture of a silane coupling agent, alkyltrialkoxysilane and tetraalkoxysilane to partial cohydrolysis•condensation.

2. A coating composition as claimed in claim 1, wherein a mixing amount of the silicone polymer is in the range of 0.1 to 50 parts by weight per 100 parts by weight of a resin solid content in the organic solvent based coating composition.

3. A coating composition prepared by mixing an organic solvent based coating composition with a silicone polymer which is a partial cohydrolysis•condensation product of a silane mixture of 100 parts by weight of (1) an alkoxysilane compound containing at least one organofunctional group selected from the group consisting of (meth)acryloyl group, vinyl group, haloalkyl group, amino group, epoxy group and mercapto group with 20 to 2000 parts by weight of (2) tetraalkoxysilane compound per 100 parts by weight of the organofunctional group containing alkoxysilane compound.

4. A coating composition as claimed in claim 3, wherein said silicone polymer has an average degree of polymerization of 3 to 100.

5. A coating composition as claimed in claim 3, wherein a mixing amount of the silicone polymer is in the range of 0.1 to 50 parts by weight per 100 parts by weight of a resin solid content in the organic solvent based coating composition.

6. A coating composition as claimed in claim 1, wherein the organofunctional group contains at least one functional group selected from the group consisting of epoxy group, mercapto group, (meth)acryloyl group, vinyl group, haloalkyl group and amino group.

* * * * *

UNITED STATES PATENT AND TRADEMARK OFFICE
CERTIFICATE OF CORRECTION

PATENT NO.   : 5,902,847
DATED        : May 11, 1999
INVENTOR(S)  : Junpei Yanagi et al.

It is certified that error appears in the above-identified patent and that said Letters Patent is hereby corrected as shown below:

<u>Title page,</u>
Item [73], Assignee, please add as co-assignee:

-- Shin-Etsu Chemical Co., Ltd.,
   Tokyo, Japan --

Signed and Sealed this

Twentieth Day of May, 2003

JAMES E. ROGAN
*Director of the United States Patent and Trademark Office*